(12) United States Patent
Ohya et al.

(10) Patent No.: US 9,067,581 B2
(45) Date of Patent: Jun. 30, 2015

(54) AUTOMATIC TRANSMISSION

(71) Applicant: HONDA MOTOR CO., LTD., Tokyo (JP)

(72) Inventors: Kumiko Ohya, Wako (JP); Shinichi Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/320,807

(22) Filed: Jul. 1, 2014

(65) Prior Publication Data

US 2015/0012191 A1    Jan. 8, 2015

(30) Foreign Application Priority Data

Jul. 5, 2013  (JP) ................................. 2013-141548

(51) Int. Cl.
| | | |
|---|---|---|
| *G06F 7/00* | (2006.01) | |
| *B60W 10/11* | (2012.01) | |
| *B60W 10/02* | (2006.01) | |
| *B60W 10/113* | (2012.01) | |
| *B60K 6/547* | (2007.10) | |
| *F16D 25/12* | (2006.01) | |
| *F16D 13/74* | (2006.01) | |
| *F16H 1/28* | (2006.01) | |
| *F16H 57/02* | (2012.01) | |

(52) U.S. Cl.
CPC ............... *B60W 10/11* (2013.01); *B60W 10/02* (2013.01); *F16H 1/2809* (2013.01); *B60W 10/113* (2013.01); *F16H 2057/02034* (2013.01); *B60W 2510/0208* (2013.01); *B60W 2520/04* (2013.01); *B60W 2520/06* (2013.01); *B60W 2710/021* (2013.01); *B60K 6/547* (2013.01); *F02N 2200/0802* (2013.01); *F16D 25/123* (2013.01); *F16D 13/74* (2013.01); *F16D 2500/70448* (2013.01)

(58) Field of Classification Search
CPC ..... B60W 10/02; B60W 10/06; B60W 10/10; B60W 10/11; B60W 20/30; B60W 2510/0208; B60W 2520/04; B60W 2520/06; B60W 2710/021; B60W 2710/06; F16H 1/2818; F16H 2003/445; F16H 2003/447; F16H 2057/0234; F16H 2057/02034; F02N 2200/0802; F02N 2200/0803; B60K 6/547; F16D 25/123; F16D 25/10; F16D 13/74; F16D 2500/70446; F16D 2500/70448; F16D 2500/7045
See application file for complete search history.

(56) References Cited

U.S. PATENT DOCUMENTS 6,397,692 B1 * 6/2002 Carriere .......................... 74/331
2012/0101677 A1 * 4/2012 Ikegami et al. .................. 701/22

(Continued)

FOREIGN PATENT DOCUMENTS

JP            4875384 B2    2/2012

*Primary Examiner* — David D Le
(74) *Attorney, Agent, or Firm* — Squire Patton Boggs (US) LLP

(57) ABSTRACT

An automatic transmission capable of causing first and second clutches and a connection/disconnection device to properly operate during stoppage of a vehicle, thereby enabling preventing vibration and improving marketability as well as obtaining excellent vehicle startability. When a shift position is switched to a forward travel position, first and second connection operations are executed for connecting transmission of a motive power of a prime mover, from first and second gear mechanisms to drive wheels, respectively, while changing the speed thereof. If the shift position is switched to the forward travel position and no request for a standing start of the vehicle is determined to be made by a driver, engagement of first and second gear clutches for connecting/disconnecting between the prime mover and the gear mechanisms is permitted when both the first and second connection operations have been completed.

4 Claims, 10 Drawing Sheets

(56) References Cited

U.S. PATENT DOCUMENTS

| | | | |
|---|---|---|---|
| 2012/0322603 A1* | 12/2012 | Kuroda et al. | 475/5 |
| 2013/0000444 A1* | 1/2013 | Okubo et al. | 74/661 |
| 2013/0045833 A1* | 2/2013 | Okubo et al. | 477/5 |

* cited by examiner

AUTOMATIC TRANSMISSION

BACKGROUND OF THE INVENTION

1. Field of the Invention

The present invention relates to an automatic transmission that transmits motive power of a prime mover in a state in which the speed of the motive power is stepwise changed, and more particularly to an automatic transmission including first and second gear mechanisms provided separately from each other.

2. Description of the Related Art

Conventionally, as an automatic transmission of this kind, one disclosed in the Publication of Japanese Patent No. 4875384 is known. This automatic transmission is used for transmitting motive power of an internal combustion engine, which is a motive power source of a vehicle, in a state in which the speed of the motive power is stepwise changed, to a drive shaft, and is comprised of a first gear mechanism, a second gear mechanism, a first clutch, a second clutch, and a shift device. The first gear mechanism includes a first drive gear group formed by a first main shaft connected to the engine, a transmission output shaft that extends in parallel with the first main shaft and is connected to the drive shaft, and a first drive gear group formed by a plurality of gears rotatably provided on the first main shaft, and a first driven gear group formed by a plurality of gears that are fixed to the transmission output shaft and are in mesh with the gears of the first drive gear group, respectively. Gear trains of a first speed position, a third speed position, and a fifth speed position are formed by the first drive gear group and the first driven gear group. The first clutch is a hydraulic multiple-disc clutch which is engaged and disengaged to thereby connect and disconnect between the engine and the first main shaft.

Further, the second gear mechanism is configured similarly to the first gear mechanism, and includes a second main shaft connected to the engine, the transmission output shaft, a second drive gear group formed by a plurality of gears fixed to the second main shaft, and a second driven gear group formed by a plurality of gears that are rotatably provided on the transmission output shaft and are in mesh with the gears of the second drive gear group, respectively. As described above, the transmission output shaft is shared as an output shaft by the first and second gear mechanisms. Further, gear trains of a second speed position and a fourth speed position are formed by the second drive gear group and the second driven gear group. The second clutch is a hydraulic multiple-disc clutch which is engaged and disengaged to thereby connect and disconnect between the engine and the second main shaft. Furthermore, the shift device is capable of executing an operation for connecting one of the gears of the first drive gear group to the first main shaft, and an operation for connecting one of the gears of the second driven gear group to the transmission output shaft.

In the conventional automatic transmission configured as above, when in a neutral state in which neither the first drive gear group nor the second driven gear group is connected, the first and second clutches are disengaged. Further, for the standing start of the vehicle, one of the gears of the first drive gear group for the first speed position is connected to the first main shaft by the shift device, and upon the lapse of a predetermined time period after completion of the connection, the first clutch is engaged.

Further, it is envisaged that in an automatic transmission, such as the above-described conventional automatic transmission, which includes the first and second gear mechanisms and the first and second clutches, during stoppage of the vehicle, there is performed the following control operation: During stoppage of the vehicle, when the shift position of a shift lever is located at a parking position or a neutral position, the first and second clutches are disengaged, whereby the engine is disconnected from the first and second gear mechanisms, and the connection of gears in the first and second gear mechanisms is released (neutral state).

Further, during stoppage of the vehicle, in a case where the shift position has been switched to a drive position, if a request for the standing start of the vehicle has not been made by the driver, to quickly start the vehicle in response to a request made afterward for the standing start of the vehicle, in the second gear mechanism, a gear for the second speed position is connected beforehand to the transmission output shaft as a gear for the standing start of the vehicle, while the second clutch is controlled to a half-clutch state without being completely engaged, and the first clutch is disengaged. In this case, it is envisaged that with a view to quickly transmitting a larger torque to the drive wheels at the standing start of the vehicle performed afterwards, to make it possible to quickly transmit motive power of the engine to the drive wheels at a transmission gear ratio of the first speed position, not only the gear for the second speed position is connected beforehand to the transmission output shaft but also the gear of the first gear mechanism for the first speed position is connected beforehand to the main shaft.

In a case where the control operation as described above (hereinafter referred to as the "during-stoppage control operation") is performed, for example, when wet multiple-disc clutches to which lubricating oil is supplied are used as the first and second clutches, there arise the following problems: The clutches of this kind are in a slightly engaged state even when they are completely disengaged, since the transmission of the motive power is not completely disconnected due to friction between friction plates of the clutches and lubricating oil (hereinafter referred to as the "clutch friction"). The clutch friction becomes larger as the amount of lubricating oil supplied to the clutches is larger, whereby the motive power transmitted via the clutches becomes larger. Further, in general, the amount of supplied lubricating oil becomes larger as the degree of engagement of the clutches is larger, since friction plates of the clutches have to be cooled by the lubricating oil.

To solve the above-described problems, in the during-stoppage control operation described above, e.g. when the second clutch is controlled to the half-clutch state before completion of connection of the gear for the first speed position, the amount of lubricating oil supplied to the first and second clutches becomes larger according to the control operation, whereby the clutch friction of the two clutches becomes larger, which in turn increases the motive power transmitted from the engine to the first and second main shafts via the first and second clutches. On the other hand, the vehicle is at a stop, whereby the rotational speed of the gear for the first speed position connected to the drive wheels is equal to 0, and hence connection of the gear for the first speed position and the first main shaft is performed in a state in which a relatively large differential rotation occurs therebetween. This causes large vibration even though the vehicle is at a stop, resulting in the degraded marketability. Such problems can similarly occur also when the first clutch is controlled to the half-clutch state before completion of connection of the gear for the second speed position in the during-stoppage control operation.

Further, there is a fear that the problems as described above occur also when dry multiple-disc clutches to which lubricating oil is not supplied or electromagnetic clutches are used as the first and second clutches. More specifically, one of the first and second clutches is sometimes not completely disengaged immediately after stoppage of the vehicle. In such a case, the motive power of the engine is transmitted to the one of the first and second main shafts, to cause the same to rotate. As a consequence, in this case as well, connection of the gear for the first speed position (gear for the second speed position) and the first main shaft (transmission output shaft) is performed in a state in which a relatively large differential rotation occurs therebetween. This can result in generation of large vibration and degraded marketability.

SUMMARY OF THE INVENTION

It is an object of the present invention to provide an automatic transmission which is capable of causing first and second clutches and a connection/disconnection device to properly operate during stoppage of a vehicle, whereby it is possible not only to prevent vibration and improve marketability but also to obtain excellent startability of a vehicle.

To attain the above object, the present invention provides an automatic transmission for transmitting motive power of a prime mover to drive wheels of a vehicle in a state in which a speed of the motive power is stepwise changed, comprising a first gear mechanism that is connected to the prime mover and the drive wheels, for transmitting the motive power of the prime mover to the drive wheels in a state in which the speed of the motive power is changed at a transmission gear ratio of one speed position of a first speed position group composed of a plurality of speed positions, a first clutch that is engaged/disengaged to thereby connect/disconnect between the prime mover and the first gear mechanism, a second gear mechanism that is disposed in parallel with the first gear mechanism, and is connected to the prime mover and the drive wheels, for transmitting the motive power of the prime mover to the drive wheels in a state in which the speed of the motive power is changed at a transmission gear ratio of one speed position of a second speed position group composed of a plurality of speed positions, a second clutch that is engaged/disengaged to thereby connect/disconnect between the prime mover and the second gear mechanism, control means for controlling the first and second clutches, a connection/disconnection device that is provided in the first and second gear mechanisms, and is capable of executing a first connection operation for selecting one speed position from the first speed position group and connecting transmission of motive power from the first gear mechanism to the drive wheels, using the selected one speed position, a first disconnection operation for disconnecting the transmission of the motive power, a second connection operation for selecting one speed position from the second speed position group and connecting transmission of motive power from the second gear mechanism to the drive wheels, using the selected one speed position, and a second disconnection operation for disconnecting the transmission of the motive power, shift position-detecting means for detecting a shift position of a shift lever selectively operated by a driver of the vehicle to one of a plurality of shift positions including a non-traveling position for stoppage of the vehicle, and a forward travel position for forward travel of the vehicle, and determination means for determining whether or not a request for a standing start of the vehicle has been made by the driver, wherein when the detected shift position is at the non-traveling position, the control means disengages the first and second clutches, wherein thereafter, when the shift position is switched from the non-traveling position to the forward travel position, the connection/disconnection device executes the first and second connection operations, and in the second connection operation, selects a predetermined standing start speed position for the standing start of the vehicle from the second speed position group, and wherein in a case where the shift position is switched to the forward travel position, and also it is determined that the request for the standing start of the vehicle has not been made by the driver, when both the first and second connection operations have been completed, the control means permits engagement of the first and second clutches.

With the configuration of this automatic transmission, the first and second gear mechanisms are arranged in parallel with each other, and are connected to the prime mover and the drive wheels of the vehicle. The speed of the motive power transmitted from the prime mover via the first gear mechanism is changed at the transmission gear ratio of one of the speed positions of the first speed position group, and the speed of the motive power transmitted from the prime mover via the second gear mechanism is changed at the transmission gear ratio of one of the speed positions of the second speed position group. Further, the first clutch is engaged and disengaged to thereby connect and disconnect between the prime mover and the first gear mechanism, and the second clutch is engaged and disengaged to thereby connect and disconnect between the prime mover and the second gear mechanism. Furthermore, the connection/disconnection device provided in the first and second gear mechanisms executes the first connection operation for selecting one speed position from the first speed position group and connecting the transmission of the motive power from the first gear mechanism to the drive wheels, using the selected one speed position, the first disconnection operation for disconnecting the transmission of the motive power, the second connection operation for selecting one speed position from the second speed position group and connecting the transmission of the motive power from the second gear mechanism to the drive wheels, using the selected one speed position, and the second disconnection operation for disconnecting the transmission of the motive power.

Further, when the shift position of the shift lever is at the non-traveling position, the first and second clutches are disengaged to thereby disconnect between the prime mover and the first and second gear mechanisms. Furthermore, when the shift position is switched from the non-traveling position to the forward travel position, the first and second connection operations are executed by the connection/disconnection device, whereby the transmission of the motive power from the first and second gear mechanisms to the drive wheels is connected. Further, in the case where the shift position is switched to the forward travel position, when it is determined that a request for the standing start of the vehicle has not been made by the driver, i.e. during stoppage of the vehicle, the engagement of the first and second clutches which have been in a disengaged state before that time is permitted after completion of the first and second connection operations. In other words, the engagement of the first and second clutches is inhibited up to completion of the first and second connection operations.

With this operation, during stoppage of the vehicle, differently from the during-stoppage control operation as described hereinabove, neither the first connection operation nor the second connection operation is executed during or after completion of an engagement operation of one of the first and second clutches. Therefore, it is possible to avoid execution of the first and second connection operations in a state in which a large differential rotation is generated between portions of the first and second gear mechanisms, connected to the prime mover, and portions of the two gear mechanisms, connected to the drive wheels, which in turn prevents vibration from being caused by executing the first and second connection operations, thereby making it possible to improve marketability.

In this case, the first and second connection operations are executed beforehand when the shift position has been switched to the forward travel position. Further, the predetermined standing start speed position for the standing start of the vehicle is selected from the second speed position group as a speed position for use in the second connection operation. From the above, at the subsequent standing start of the vehicle, torque of the prime mover can be transmitted to the drive wheels quickly via one of the first and second clutches and one of the first and second gear mechanisms, associated with the one of the first and second clutches, and therefore it is possible to obtain the excellent startability of the vehicle. As described above, according to the present invention, it is possible to cause the first and second clutches and the connection/disconnection device to properly operate during stoppage of the vehicle, thereby making it possible not only to prevent vibration and improve marketability but also to obtain excellent startability of the vehicle.

Preferably, the connection/disconnection device selects a speed position with a transmission gear ratio larger than a transmission gear ratio of the predetermined standing start speed position, from the first speed position group, as a speed position for use in the first connection operation executed when the shift position has been switched to the forward travel position, and the automatic transmission further comprises required torque-calculating means for calculating a required torque required for the drive wheels, wherein in a case where the shift position has been switched to the forward travel position, and also it is determined that the request for the standing start of the vehicle has been made by the driver, when both the first and second connection operations have been completed, the control means selects and engages one of the first and second clutches and disengages the other of the first and second clutches, based on the calculated required torque.

With the configuration of the preferred embodiment, the speed position with the transmission gear ratio larger (on a lower-speed side) than the transmission gear ratio of the standing start speed position is selected from the first speed position group, as the speed position for use in the first connection operation executed when the shift position has been switched to the forward travel position. With this operation, the increasing degree of torque by the first gear mechanism becomes larger than that of torque by the second gear mechanism. Further, the required torque required for the drive wheels is calculated by the required torque-calculating means.

Further, in the case where the shift position has been switched to the forward travel position, and it is determined that the request for the standing start of the vehicle has been made by the driver, when both the first and second connection operations have been completed, one of the first and second clutches is selected and engaged, and the other of the first and second clutches is disengaged, based on the calculated required torque. With this operation, at the standing start of the vehicle, the torque of the prime mover can be transmitted to the drive wheels using one of the first and second gear mechanisms, associated with the selected one of the clutches, in a state in which the torque of the prime mover is increased to meet the required torque.

Preferably, the first and second clutches are formed by wet clutches that use lubricating oil, and the automatic transmission further comprises a lubricating oil supply system that supplies lubricating oil to the first and second clutches, and is capable of changing a lubricating oil supply amount, which is an amount of lubricating oil supplied to the first and second clutches, wherein when one of the first and second clutches is engaged, the lubricating oil supply system sets the lubricating oil supply amount to a first predetermined amount, whereas when both of the first and second clutches are disengaged, the lubricating oil supply system sets the lubricating oil supply amount to a second predetermined amount smaller than the first predetermined amount.

With the configuration of the preferred embodiment, the lubricating oil supply amount, which is the amount of lubricating oil supplied to the first and second clutches, is changed by the lubricating oil supply system. The first and second clutches are formed by so-called wet clutches, and hence even during disengagement of the clutches, when the lubricating oil supply amount is large, again, clutch friction becomes larger, as described hereinabove, whereby the motive power transmitted from the prime mover to the respective first and second gear mechanisms via the first and second clutches becomes larger. As a consequence, there can arise a problem of the above-described first and second connection operations, i.e. a problem that large vibration is generated and marketability is degraded.

With the above-described configuration, when one of the first and second clutches is engaged, the lubricating oil supply amount is set to the first predetermined amount, whereas when both of the first and second clutches are disengaged, the lubricating oil supply amount is set to the second predetermined amount, which is set to a value smaller than the first predetermined amount. This makes it possible to prevent the above-described problem from occurring, since clutch friction caused when both the first and second clutches are disengaged can be suppressed.

The above and other objects, features, and advantages of the present invention will become more apparent from the following detailed description taken in conjunction with the accompanying drawings.

DETAILED DESCRIPTION OF PREFERRED EMBODIMENTS

The invention will now be described in detail with reference to the drawings showing preferred embodiment thereof.

Figure 1:
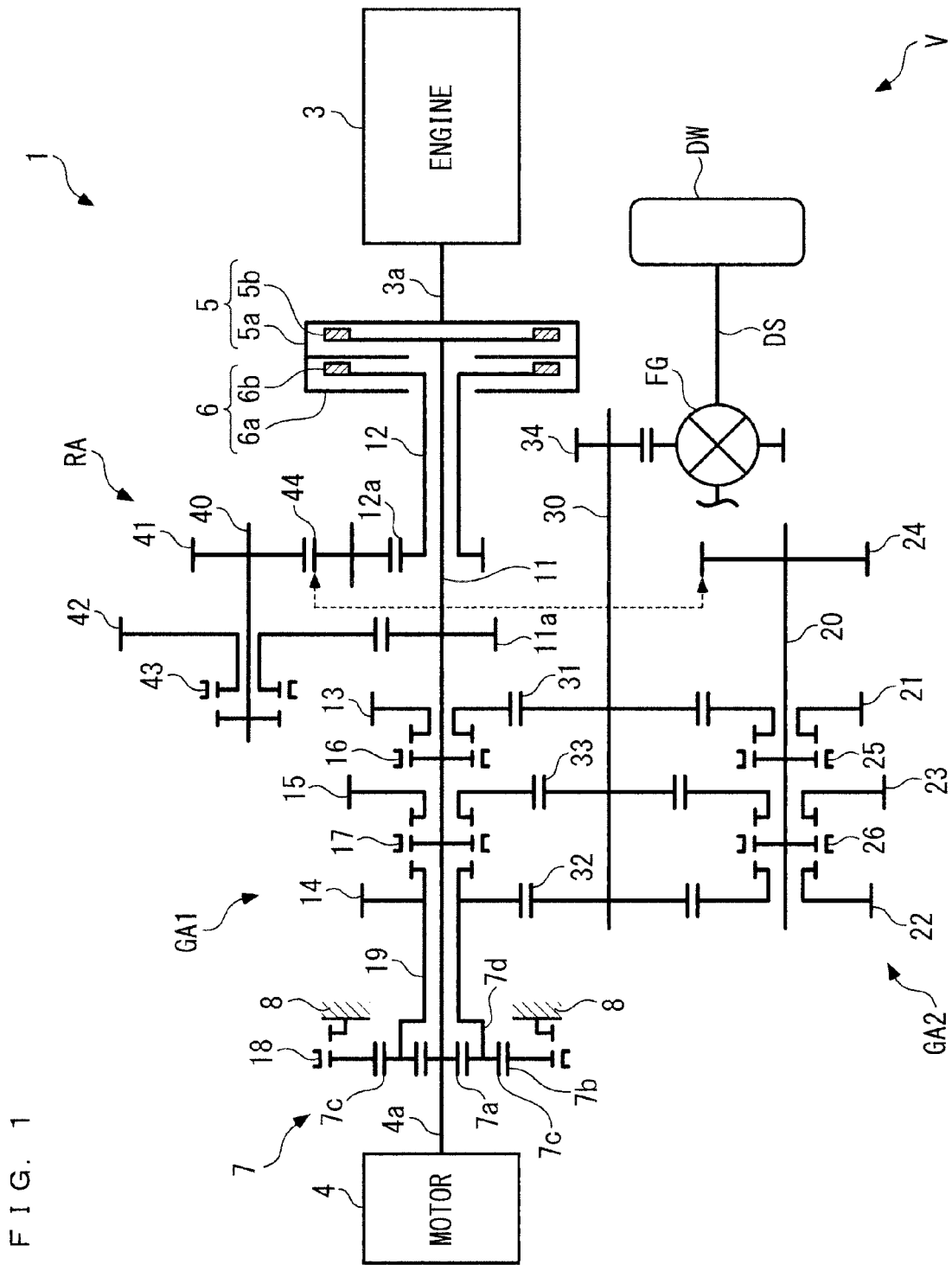
FIG. 1 is a skeleton diagram of an automatic transmission according to an embodiment of the present invention and a vehicle to which the automatic transmission is applied.

A vehicle V shown in FIG. 1 is a so-called hybrid vehicle, and is equipped with an internal combustion engine (hereinafter referred to as the "engine") 3 and an electric motor (hereinafter referred to as the "motor") 4 as motive power sources, a pair of drive wheels DW (only one of which is shown), and a pair of driven wheels (not shown).

The engine 3 is a gasoline engine including a plurality of cylinders, and includes a crankshaft 3a for outputting motive power, and fuel injection valves (not shown) and spark plugs (not shown). The fuel injection valves and the spark plugs are provided for the respective cylinders. The operations of the fuel injection valves and the spark plugs are controlled by an ECU 2 appearing in FIG. 2, whereby the operating state of the engine 3 is controlled. Further, the motor 4 is a brushless DC motor, and includes an output shaft 4a for outputting motive power. The operation of the motor 4 is controlled by the ECU 2.

An automatic transmission 1 according the present embodiment is used to transmit motive power of the engine 3 and the motor 4 to the drive wheels DW while stepwise changing the speed of the motive power. Specifically, the automatic transmission 1 is a so-called dual-clutch type automatic transmission, and includes a first clutch 5, a second clutch 6, a first gear mechanism GA1, a second gear mechanism GA2 disposed in parallel with the first gear mechanism GA1, a reverse mechanism RA, a connection/disconnection mechanism, and the ECU 2 (see FIG. 2).

The first clutch 5 is a wet multiple-disc clutch, and includes an outer clutch plate 5a coaxially fixed to the crankshaft 3a, an inner clutch plate 5b coaxially fixed to one end of a first input shaft 11, referred to hereinafter, of the first gear mechanism GA1, a first clutch actuator 51 (see FIG. 2), and a return spring (not shown) which urges the inner clutch plate 5b such that the inner clutch plate 5b is moved away from the outer clutch plate 5a.

The first clutch actuator 51 uses oil pressure as a motive power source. When a drive signal is input from the ECU 2, the first clutch actuator 51 drives the inner clutch plate 5b toward the outer clutch plate 5a against the urging force of the return spring. The first clutch actuator 51 is thus driven by the ECU 2, whereby the degree of engagement of the first clutch 5 is changed to engage and disengage the first clutch 5, whereby the engine 3 and the first input shaft 11 are connected to and disconnected from each other.

Figure 2:
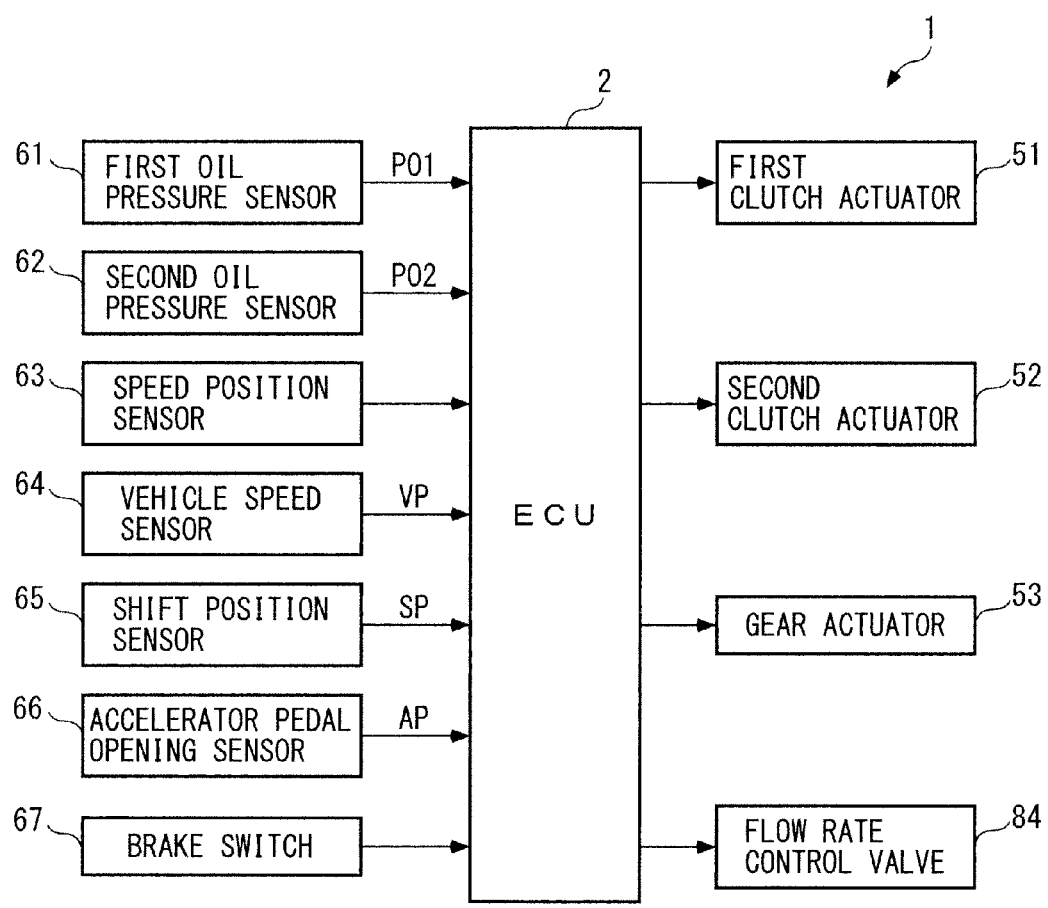
FIG. 2 is a block diagram of an ECU etc. of the automatic transmission.

Further, the first clutch actuator 51 is provided with a first oil pressure sensor 61 (see FIG. 2). The first oil pressure sensor 61 detects oil pressure supplied to the first clutch actuator 51 (hereinafter referred to as the "first clutch oil pressure PO1"), and delivers a signal indicative of the detected first clutch oil pressure Pa1 to the ECU 2. The ECU 2 determines whether the first clutch 5 is engaged or disengaged, based on the detected first clutch oil pressure PO1. In this case, the degree of engagement of the first clutch 5 becomes larger as the first clutch oil pressure PO1 is larger, and when the first clutch oil pressure PO1 is equal to a predetermined disengagement pressure PREL, the first clutch 5 is in a disengaged state.

The second clutch 6 is a wet multiple-disc clutch, similar to the first clutch 5, and includes an outer clutch plate 6a coaxially fixed to the outer clutch plate 5a of the first clutch 5, an inner clutch plate 6b coaxially fixed to one end of a second input shaft 12, referred to hereinafter, of the second gear mechanism GA2, a second clutch actuator 52 (see FIG. 2), and a return spring (not shown) which urges the inner clutch plate 6b such that the inner clutch plate 6b is moved away from the outer clutch plate 6a.

The second clutch actuator 52 is configured similarly to the above-described first clutch actuator 51. When a drive signal is input from the ECU 2, the second clutch actuator 52 drives the inner clutch plate 6b of the second clutch 6 toward the outer clutch plate 6a against the urging force of the return spring. The second clutch actuator 52 is thus driven by the ECU 2, whereby the degree of engagement of the second clutch 6 is changed to engage and disengage the second clutch 6, whereby the engine 3 and the second input shaft 12 are connected to and disconnected from each other.

Further, the second clutch actuator 52 is provided with a second oil pressure sensor 62 (see FIG. 2). The second oil pressure sensor 62 detects oil pressure supplied to the second clutch actuator 52 (hereinafter referred to as the "second clutch oil pressure PO2"), and delivers a signal indicative of the detected second clutch oil pressure PO2 to the ECU 2. The ECU 2 determines whether the second clutch 6 is engaged or disengaged, based on the detected second clutch oil pressure PO2. In this case, the degree of engagement of the second clutch 6 becomes larger as the second clutch oil pressure PO2 is larger, and when the second clutch oil pressure PO2 is equal to the above-mentioned predetermined disengagement pressure PREL, the second clutch 6 is in a disengaged state.

The first gear mechanism GA1 is used for transmitting input motive power to the drive wheels DW in a state in which the speed of the motive power is changed at a transmission gear ratio of one of first, third, fifth, and seventh speed positions for forward travel. These first to seventh speed positions have their transmission gear ratios set to higher-speed values as the number of the speed position is larger. The same applies to speed positions, referred to hereinafter, of the second gear mechanism GA2. Specifically, the first gear mechanism GA1 includes a planetary gear unit 7, the first input shaft 11, a third speed drive gear 13, a fifth speed drive gear 14, and a seventh speed drive gear 15, which are arranged coaxially with the crankshaft 3a of the engine 3, an output shaft 30 arranged in parallel with the first input shaft 11, a second-third speed driven gear 31, a fourth-fifth speed driven gear 32, and a sixth-seventh speed driven gear 33.

The planetary gear unit 7 is of a single planetary type, and includes a sun gear 7a, a ring gear 7b which is rotatably provided around an outer periphery of the sun gear 7a, a plurality of planetary gears 7c (only two of which are shown) in mesh with the gears 7a and 7b, and a rotatable carrier 7d rotatably supporting the planetary gears 7c. The sun gear 7a is coaxially fixed to the above-mentioned output shaft 4a of the motor 4, and is coaxially fixed to the other end of the first input shaft 11. The first input shaft 11 is rotatably supported by a casing 8 via bearings (not shown). With the above arrangement, the inner clutch plate 5b of the first clutch 5, the first input shaft 11, the sun gear 7a, and the output shaft 4a of the motor 4 are rotatable in unison with each other. Further, the carrier 7d is coaxially fixed to a hollow cylindrical rotating shaft 19 rotatably supported by bearings (not shown). The first input shaft 11 is relatively rotatably arranged inside the rotating shaft 19. The rotating shaft 19 is rotatably supported by the casing 8 via bearings (not shown).

The third speed drive gear 13 and the seventh speed drive gear 15 are coaxially and relatively rotatably arranged on the first input shaft 11. The fifth speed drive gear 14 is coaxially fixed to the above-mentioned rotating shaft 19. With the above arrangement, the fifth speed drive gear 14, the rotating shaft 19, and the carrier 7d are rotatable in unison with each other. Further, the third speed drive gear 13, the seventh speed drive gear 15, and the fifth speed drive gear 14 are arranged at respective locations in the mentioned order from the side of the engine 3 toward the side of the motor 4.

The second-third speed driven gear 31, the fourth-fifth speed driven gear 32, and the sixth-seventh speed driven gear 33 are coaxially fixed to the output shaft 30, and are in mesh with the third speed drive gear 13, the fifth speed drive gear 14, and the seventh speed drive gear 15, respectively. The output shaft 30 is rotatably supported by the casing 8 via bearings (not shown). Further, an output gear 34 is coaxially fixed to the output shaft 30. A gear of a final reduction gear box FG is in mesh with the output gear 34. The final reduction gear box FG is connected to the above-mentioned pair of drive wheels DW via a pair of drive shafts DS (only one of which is shown).

Further, the above-mentioned second gear mechanism GA2 transmits input motive power to the drive wheels DW in a state in which the speed of the motive power is changed at a transmission gear ratio of one of second, fourth, and sixth speed positions for forward travel. In the automatic transmission 1, the second speed position is set as a speed position for starting the vehicle V. Specifically, the second gear mechanism GA2 includes the second input shaft 12 arranged coaxially with the crankshaft 3a, an auxiliary shaft 20 arranged in parallel with the above-described first input shaft 11 and output shaft 30, a second speed drive gear 21, a fourth speed drive gear 22, a sixth speed drive gear 23, and the above-described output shaft 30, second-third speed driven gear 31, fourth-fifth speed driven gear 32, and sixth-seventh speed driven gear 33. As described above, the output shaft 30, the second-third speed driven gear 31, the fourth-fifth speed driven gear 32, and the sixth-seventh speed driven gear 33 are shared by the first and second gear mechanisms GA1 and GA2.

The second input shaft 12 is formed to be hollow, and is rotatably supported by the casing 8 via bearings (not shown). A gear 12a is coaxially fixed to the other end of the second input shaft 12 and is in mesh with an idler gear 44. The above-mentioned auxiliary shaft 20 is rotatably supported by the casing 8 via bearings (not shown). An input gear 24 is coaxially fixed to the auxiliary shaft 20 and is in mesh with the above-mentioned idler gear 44. Further, the second speed drive gear 21, the fourth speed drive gear 22, and the sixth speed drive gear 23 are coaxially and relatively rotatably arranged on the auxiliary shaft 20, and are in mesh with the second-third speed driven gear 31, the fourth-fifth speed driven gear 32, and the sixth-seventh speed driven gear 33, respectively. The input gear 24, the second speed drive gear 21, the sixth speed drive gear 23, and the fourth speed drive gear 22 are arranged at respective locations in the mentioned order from the side of the engine 3 toward the side of the motor 4.

The reverse mechanism RA transmits the motive power of the engine 3 to the drive wheels DW such that the drive wheels DW perform reverse rotation in order to cause the vehicle V to travel backward, and includes a reverse shaft 40, a reverse input gear 41, and a reverse gear 42. The reverse input gear 41 is coaxially fixed to the reverse shaft 40 and is in mesh with the above-mentioned idler gear 44. Further, the reverse gear 42 is coaxially and relatively rotatably arranged on the reverse shaft 40 and is in mesh with an input gear 11a coaxially fixed to the first input shaft 11.

The above-mentioned connection/disconnection mechanism is provided for connecting/disconnecting transmission of motive power from the first and second gear mechanisms GA1 and GA2 and the reverse mechanism. RA to the drive wheels DW, and includes a third speed synchronization mechanism 16, a fifth-seventh speed synchronization mechanism 17, a first speed synchronization mechanism 18, a second speed synchronization mechanism 25, a fourth-sixth speed synchronization mechanism 26, and a reverse synchronization mechanism 43. Although detailed description is omitted, the third speed synchronization mechanism 16 is configured similarly to a synchronization mechanism proposed by the present applicant e.g. in the Publication of Japanese Patent No. 4242189, and is connected to a gear actuator 53 (see FIG. 2) via a third speed shift fork (not shown).

The gear actuator 53 is a combination of an electric motor, a gear mechanism, and the like, and actuates the third speed synchronization mechanism 16 via the third speed shift fork according to a drive signal from the ECU 2. This causes the third speed synchronization mechanism 16 to selectively execute a third speed position in-gear operation for connecting the third speed drive gear to the first input shaft 11, and a disconnection operation for disconnecting them from each other.

The fifth-seventh speed synchronization mechanism 17, the first speed synchronization mechanism 18, the second speed synchronization mechanism 25, the fourth-sixth speed synchronization mechanism 26, and the reverse synchronization mechanism 43 are all configured similarly to the above-mentioned third speed synchronization mechanism 16, and are connected to the gear actuator 53 via a fifth-seventh speed shift fork, a first speed shift fork, a second speed shift fork, a fourth-sixth speed shift fork, and a reverse shift fork, respectively. The fifth-seventh speed synchronization mechanism 17 is actuated by the gear actuator 53, to thereby selectively execute a fifth speed position in-gear operation for connecting the fifth speed drive gear 14 to the first input shaft 11, a seventh speed position in-gear operation for connecting the seventh speed drive gear 15 to the first input shaft 11, and a disconnection operation for disconnecting both the fifth and seventh speed drive gears 14 and 15 from the first input shaft 11. The first speed synchronization mechanism 18 is actuated by the gear actuator 53, to thereby selectively execute a first speed position in-gear operation for connecting the ring gear 7b of the planetary gear unit 7 to the casing 8, and a disconnection operation for disconnecting them from each other.

Further, the second speed synchronization mechanism 25 is actuated by the gear actuator 53, to thereby selectively execute a second speed position in-gear operation for connecting the second speed drive gear 21 to the auxiliary shaft 20, and a disconnection operation for disconnecting them from each other. Further, the fourth-sixth speed synchronization mechanism 26 is actuated by the gear actuator 53, to thereby selectively execute a fourth speed position in-gear operation for connecting the fourth speed drive gear 22 to the auxiliary shaft 20, a sixth speed position in-gear operation for connecting the sixth speed drive gear 23 to the auxiliary shaft 20, and a disconnection operation for disconnecting both the fourth and sixth speed drive gears 22 and 23 from the auxiliary shaft 20. The reverse synchronization mechanism 43 is actuated by the gear actuator 53, to thereby selectively execute a backward travel position in-gear operation for connecting the reverse gear 42 to the reverse shaft 40, and a disconnection operation for disconnecting them from each other.

In the automatic transmission 1 configured as above, the motive power of the engine 3 is transmitted to the drive wheels DW by the first or second gear mechanism GA1 or GA2 in a state in which the speed of the motive power is stepwise changed. Specifically, when the first gear mechanism GA1 is used, the first clutch 5 is engaged to thereby connect between the crankshaft 3a and the first input shaft 11, and the second clutch 6 is disengaged to thereby disconnect between the crankshaft 3a and the second input shaft 12. This causes the motive power of the engine 3 to be transmitted to the first input shaft 11.

In this case, when the speed of the motive power of the engine 3 is changed at a transmission gear ratio of the first speed position of the first gear mechanism GA1, the ring gear 7b is connected to the casing 8 by the above-mentioned first speed position in-gear operation of the first speed synchronization mechanism 18, whereby the ring gear 7b is made unrotatable. Further, the third, fifth, and seventh speed drive gears 13, 14, and 15 are disconnected from the first input shaft 11 by the disconnection operations of the third speed synchronization mechanism 16 and the fifth-seventh speed synchronization mechanism 17. From the above, the speed position of the first gear mechanism GA1 is set to the first speed position, and the motive power transmitted from the engine 3 to the first input shaft 11 is transmitted to the right and left drive wheels DW via the sun gear 7a and the carrier 7d of the planetary gear unit 7, the rotating shaft 19, the fifth speed drive gear 14, the fourth-fifth speed driven gear 32, the output shaft 30, the output gear 34, the final reduction gear box FG, and the right and left drive shafts DS. At this time, the speed of the motive power of the engine 3 is changed at the transmission gear ratio of the first speed position determined by the number of gear teeth of the sun gear 7a, the number of gear teeth of the ring gear 7b, the number of gear teeth of the fifth speed drive gear 14, the number of gear teeth of the fourth-fifth speed driven gear 32, and so forth.

Further, when the speed of the motive power of the engine 3 is changed at a transmission gear ratio of the third speed position of the first gear mechanism GA1, the ring gear 7b is disconnected from the casing 8 by the disconnection operation of the first speed synchronization mechanism 18, whereby the rotation of the ring gear 7b is permitted. Further, the third speed drive gear 13 is connected to the first input shaft 11 by the third speed position in-gear operation of the third speed synchronization mechanism 16, while both the fifth and seventh speed drive gears 14 and 15 are disconnected from the first input shaft 11 by the disconnection operation of the fifth-seventh speed synchronization mechanism 17. From the above, the speed position of the first gear mechanism GA1 is set to the third speed position, and the motive power transmitted from the engine 3 to the first input shaft 11 is transmitted to the right and left drive wheels DW via the third speed drive gear 13, the second-third speed driven gear 31, the output shaft 30, and so forth. At this time, the speed of the motive power of the engine 3 is changed at the transmission gear ratio of the third speed position determined e.g. by the number of gear teeth of the third speed drive gear 13, and the number of gear teeth of the second-third speed driven gear 31.

Note that cases where the speed of the motive power of the engine 3 is changed at respective transmission gear ratios of the fifth and seventh speed positions of the first gear mechanism GA1 are distinguished from the above-described case of the third speed position only in that the fifth speed drive gear 14 and the seventh speed drive gear 15 are connected to the first input shaft 11, respectively, and the other operations are basically the same as in the case of the third speed position. Therefore, detailed description of the respective cases of the fifth and seventh speed positions will be omitted.

Further, the disconnection operations are executed by the third speed synchronization mechanism 16, the fifth-seventh speed synchronization mechanism 17, and the first speed synchronization mechanism 18, whereby the third, fifth, and seventh speed drive gears 13, 14, and 15 are disconnected from the first input shaft 11, and the ring gear 7b is disconnected from the casing 8. This disconnects transmission of the motive power from the first gear mechanism GA1 to the drive wheels DW. Hereinafter, to execute the disconnection operations by the third speed synchronization mechanism 16, the fifth-seventh speed synchronization mechanism 17, and the first speed synchronization mechanism 18 will be referred to as "to execute a first disconnection operation", and a state in which transmission of the motive power from the first gear mechanism GA1 to the drive wheels DW is disconnected by executing the first disconnection operation is referred to as the "neutral state of the first gear mechanism GA1" as deemed appropriate.

Furthermore, when the motive power of the engine 3 is transmitted to the drive wheels DW using the second gear mechanism GA2, the first clutch 5 is disengaged to thereby disconnect between the crankshaft 3a and the first input shaft 11, and the second clutch 6 is engaged to thereby connect between the crankshaft 3a and the second input shaft 12. This causes the motive power of the engine 3 to be transmitted to the second input shaft 12.

In this case, when the speed of the motive power of the engine 3 is changed at a transmission gear ratio of the second speed position of the second gear mechanism GA2, the second speed drive gear 21 is connected to the auxiliary shaft 20 by the second speed position in-gear operation of the second speed synchronization mechanism 25, and both the fourth and sixth speed drive gears 22 and 23 are disconnected from the auxiliary shaft 20 by the disconnection operation of the fourth-sixth speed synchronization mechanism 26. From the above, the speed position of the second gear mechanism GA2 is set to the second speed position, and the motive power transmitted from the engine 3 to the second input shaft 12 is transmitted to the drive wheels DW via the gear 12a, the idler gear 44, the input gear 24, the auxiliary shaft 20, the second speed drive gear 21, the second-third speed driven gear 31, the output shaft 30, and so forth. At this time, the speed of the motive power of the engine 3 is changed at the transmission gear ratio of the second speed position determined by the number of gear teeth of the second speed drive gear 21, the number of gear teeth of the second-third speed driven gear 31, and so forth.

Note that cases where the speed of the motive power of the engine 3 is changed at respective transmission gear ratios of the fourth and sixth speed position are distinguished from the above-described case of the second speed position only in that the fourth and sixth speed drive gears 22 and 23 are connected to the auxiliary shaft 20, respectively, and the other operations are basically the same as in the case of the second speed position. Therefore, detailed description of the respective cases of the fourth and sixth speed positions will be omitted.

Further, the second, fourth, and sixth speed drive gears 21, 22, and 23 are disconnected from the auxiliary shaft 20 by executing the disconnection operations by the second speed synchronization mechanism 25 and the fourth-sixth speed synchronization mechanism 26, whereby transmission of the motive power from the second gear mechanism GA2 to the drive wheels DW is disconnected. Hereafter, to execute the disconnection operations by the second speed synchronization mechanism 25 and the fourth-sixth speed synchronization mechanism 26 will be referred to as "to execute a second disconnection operation", and a state in which transmission of the motive power from the second gear mechanism GA2 to the drive wheels DW is disconnected by executing the second disconnection operation is referred to as the "neutral state of the second gear mechanism GA2" as deemed appropriate.

Furthermore, when the motive power transmitted to the first or second input shaft 11 or 12 is transmitted to the drive wheels DW by changing the direction of rotation of the motive power to the direction of reverse rotation using the reverse mechanism RA, the first and second gear mechanisms GA1 and GA2 are controlled to the neutral states by executing the above-described first and second disconnection operations, and the reverse gear 42 is connected to the reverse shaft 40 by the above-described backward travel position in-gear operation of the reverse synchronization mechanism 43. From the above, the motive power transmitted to the first or second input shaft 11 or 12 is transmitted to the drive wheels DW via the reverse mechanism RA and so forth in a state in which the direction of rotation of the motive power is changed to the direction of reverse rotation.

Further, the reverse gear 42 is disconnected from the reverse shaft 40 by executing the disconnection operation by the reverse synchronization mechanism 43, whereby transmission of motive power from the reverse mechanism RA to the drive wheels DW is disconnected. Hereinafter, to execute the disconnection operation by the reverse synchronization mechanism 43 will be referred to as "to execute a third disconnection operation", and a state in which transmission of the motive power from the reverse mechanism RA to the drive wheels DW is disconnected by executing the third disconnection operation is referred to as the "neutral state of the reverse mechanism RA" as deemed appropriate.

A speed position sensor 63 (see FIG. 2) is disposed close to the gear actuator 53. The speed position sensor 63 detects an operating state of the gear actuator 53, and delivers a signal indicative of the detected operating state of the gear actuator 53 to the ECU 2. The ECU 2 determines whether or not each of the above-described first to seventh speed position in-gear operations and backward travel position in-gear operation has been completed, based on the detection signal from the speed position sensor 63.

Figure 3:
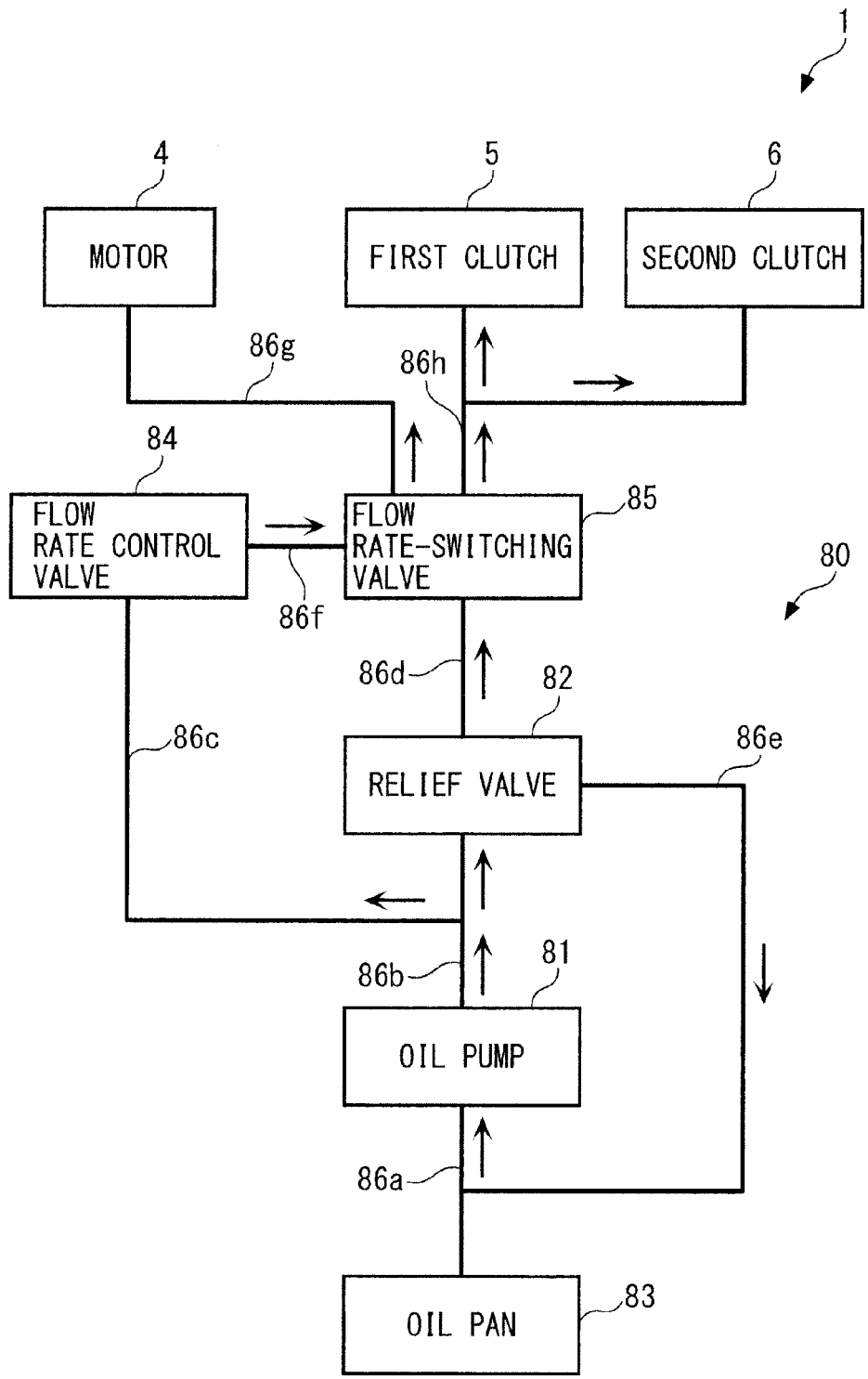
FIG. 3 is a schematic view of a lubricating oil supply system of the automatic transmission.

Further, as shown in FIG. 3, the automatic transmission 1 is provided with a lubricating oil supply system 80. The lubricating oil supply system 80 supplies lubricating oil to the motor 4, the first and second clutches 5 and 6, and so forth, and includes an oil pump 81, a relief valve 82, an oil pan 83, a flow rate control valve 84, and a flow rate-switching valve 85.

The oil pump 81 is of a mechanically-driven type using the engine 3 as a motive power source. During operation of the oil pump 81, the oil pump 81 draws lubricating oil stored in the oil pan 83 via an oil passage 86a, and discharges the drawn lubricating oil into the relief valve 82 and the flow rate control valve 84 via an oil passage 86b and an oil passage 86c. In this case, when a discharge pressure from the oil pump 81 is not lower than a predetermined relief pressure, the relief valve 82 is opened, whereby the lubricating oil is returned to the oil passage 86a via an oil passage 86e. Further, when the discharge pressure from the oil pump 81 is lower than the predetermined relief pressure, the relief valve 82 is held in a closed state, whereby the lubricating oil discharged from the oil pump 81 is supplied to the flow rate-switching valve 85 via an oil passage 86d.

Further, the flow rate control valve 84 is of a normally closed type, and is electrically connected to the ECU 2. When a drive signal is being input from the ECU 2, the flow rate control valve 84 is held in an open state, whereby a control oil pressure is supplied to the flow rate-switching valve 85 via an oil passage 86f. On the other hand, when the drive signal is not being input from the ECU 2, the flow rate control valve 84 is held in a closed state, whereby the control oil pressure is not supplied to the flow rate-switching valve 85.

Further, the flow rate-switching valve 85 is a spool valve, and supplies lubricating oil supplied from the oil pump 81 to the motor 4 and the first and second clutches 5 and 6 by distributing the lubricating oil therebetween via oil passages 86g and 86h, respectively, while having a distribution ratio for distributing the lubricating oil between the two switched according to whether or not the control oil pressure is supplied from the flow rate control valve 84. Specifically, when the control oil pressure is supplied from the flow rate control valve 84 to the flow rate-switching valve 85, the lubricating oil is supplied to the first and second clutches 5 and 6 at a large flow rate, but is supplied to the motor 4 at a small flow rate. Further, when the control oil pressure is not supplied from the flow rate control valve 84 to the flow rate-switching valve 85, inversely to the above, the lubricating oil is supplied to the first and second clutches 5 and 6 at a small flow rate, but is supplied to the motor 4 at a large flow rate. Hereinafter, the amount of the lubricating oil supplied to the first and second clutches 5 and 6 is referred to as the "clutch lubricating oil supply amount".

Further, the vehicle V is equipped with a shift lever device (not shown), an accelerator pedal (not shown), a brake pedal (not shown), and a vehicle speed sensor 64. The shift lever device is a floor shift lever, and is provided with five positions, i.e. a parking position P, a reverse position R, a neutral position N, a drive position D, and a sport position S, as shift positions. The parking position P and the neutral position N correspond to non-traveling positions for stoppage of the vehicle V. The drive position D and the sport position S correspond to forward travel positions for forward travel of the vehicle V, and the reverse position R corresponds to a backward travel position for backward travel of the vehicle V. The shift position of the shift lever device is selectively switched to one of the above five positions according to a shift operation by a driver. Note that the present invention can be applied to a vehicle of a type which is not equipped with the sport position S of the above-described five positions. Further, the vehicle speed sensor 64 detects a vehicle speed VP of the vehicle V, and delivers a signal indicative of the detected vehicle speed VP to the ECU 2.

Furthermore, the shift lever device, the accelerator pedal, and the brake pedal are provided with a shift position sensor 65, an accelerator pedal opening sensor 66, and a brake switch 67 (see FIG. 2), respectively. The shift position sensor 65 detects the shift position SP of the shift lever device, and delivers a signal indicative of the detected shift position SP to the ECU 2. The accelerator pedal opening sensor 66 detects a degree of opening AP of the accelerator pedal (hereafter referred to as the "accelerator pedal opening AP"), which is an operation amount of the accelerator pedal, and delivers a signal indicative of the detected accelerator pedal opening AP to the ECU 2. When the brake pedal is stepped on, the brake switch 67 delivers an on signal to the ECU 2, and otherwise it delivers an off signal to the ECU 2.

Figure 4:
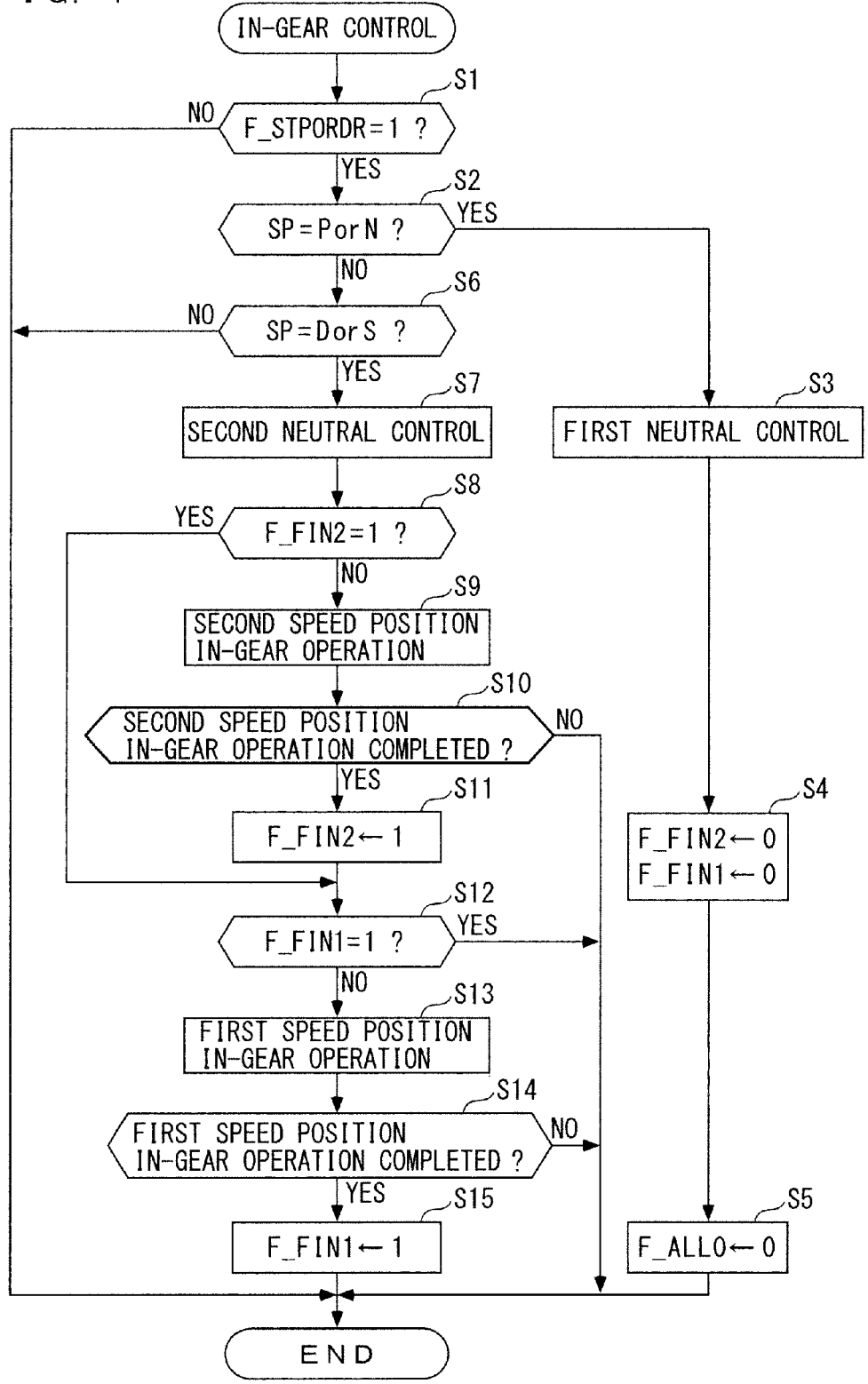
FIG. 4 is a flowchart of an in-gear control process executed by the ECU.
Figure 5:
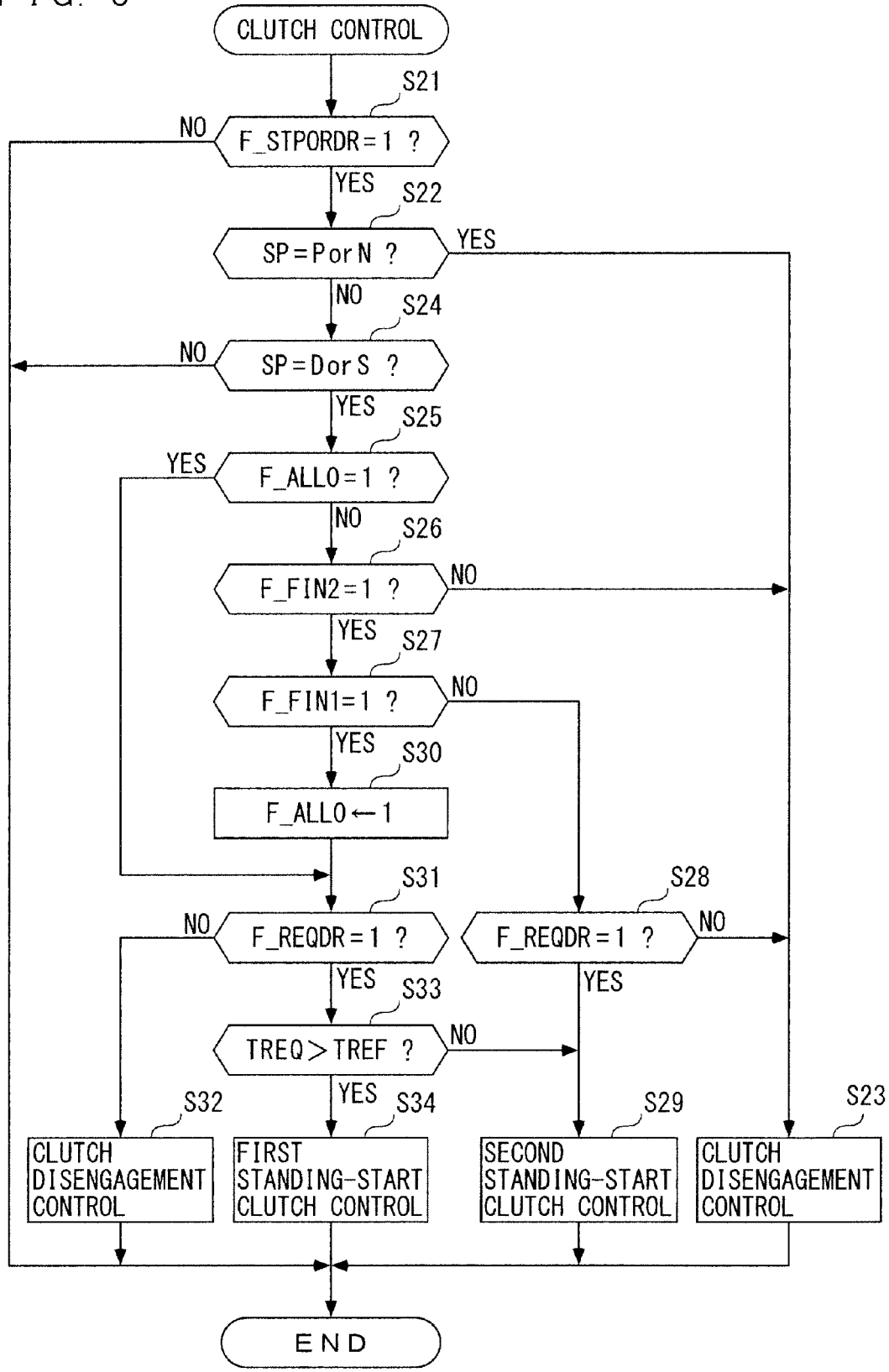
FIG. 5 is a flowchart of a clutch control process executed by the ECU.
Figure 6:
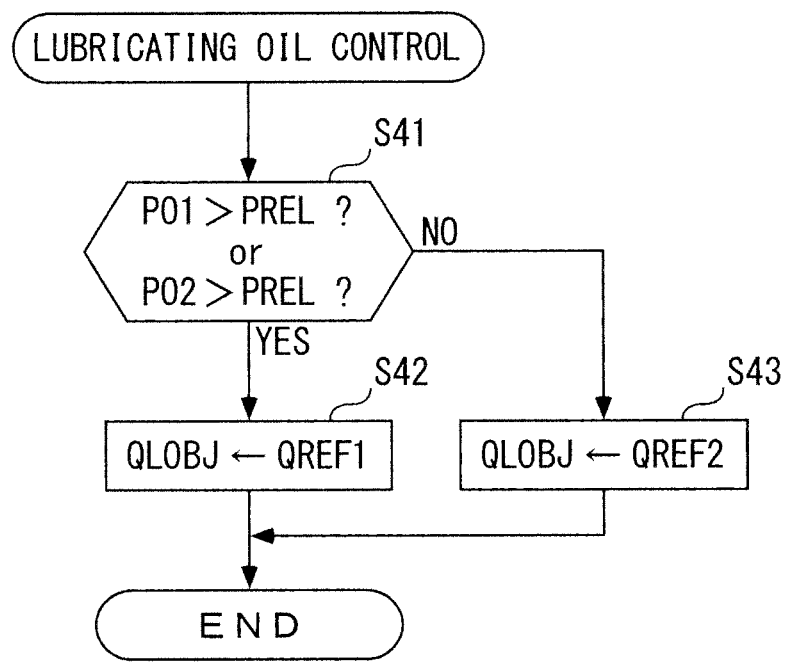
FIG. 6 is a flowchart of a lubricating oil control process executed by the ECU.

The ECU 2 is implemented by a microcomputer comprised of a CPU, a RAM, a ROM, and an I/O interface (none of which are shown), and executes processes shown in FIGS. 4 to 6 based on the detection signals from the aforementioned sensors 61 to 66 and the output signals from the brake switch 67, according to control programs stored in the ROM.

FIG. 4 shows an in-gear control process for controlling operations of the connection/disconnection mechanism including the above-described first speed synchronization mechanism 18. This process is repeatedly executed whenever a predetermined time period (e.g. 100 msec) elapses, during stoppage of and at the standing start of the vehicle V. First, in a step 1 (shown as S1 in abbreviated form; the following steps are also shown in abbreviated form), it is determined whether or not a stoppage/standing start time flag F_STPORDR is equal to 1. This stoppage/standing start time flag F_ST- PORDR is set to 1 during stoppage of or at the standing start of the vehicle V, and is set based on the detected vehicle speed VP, the accelerator pedal opening AP, and the output signal from the brake switch 67.

If the answer to the question of the step 1 is negative (NO) (F_STPORDR=0), the present process is immediately terminated, whereas if the answer to the question of the step 1 is affirmative (YES), i.e. if the vehicle V is at a stop or at a standing start, it is determined whether the detected shift position SP is at the parking position P or the neutral position N (step 2). If the answer to this question is affirmative (YES), i.e. if the shift position SP is at the parking position P or the neutral position N, first neutral control is executed (step 3). In the first neutral control, the connection/disconnection mechanism is controlled, whereby the above-described first to third disconnection operations are executed. With these operations, the first and second gear mechanisms GA1 and GA2, and the reverse mechanism RA enter the above-described neutral states, whereby transmission of the motive power from the first and second gear mechanisms GA1 and GA2, and the reverse mechanism RA to the drive wheels DW is disconnected.

In a step 4 following the above-described step 3, a second in-gear completion flag F_FIN2 and a first in-gear completion flag F_FIN1, which are referred to hereinafter, are set to 0. Then, a clutch engagement permission flag F_ALLO, referred to hereinafter, is set to 0 (step 5), followed by terminating the present process.

On the other hand, if the answer to the question of the above-described step 2 is negative (NO), i.e. if the detected shift position SP is not at either of the parking position P and the neutral position N, it is determined whether the shift position SP is at the drive position D or the sport position S (step 6). If the answer to this question is negative (NO), i.e. if the shift position SP is not at any of the parking position P, the neutral position N, the drive position D, and the sport position S but is at the reverse position R, the present process is immediately terminated.

On the other hand, if the answer to the question of the above-described step 6 is affirmative (YES), i.e. if the shift position SP is at the drive position D or the sport position S, a second neutral control is executed (step 7). In the second neutral control, the connection/disconnection mechanism is controlled, whereby the third disconnection operation is executed. With this operation the reverse mechanism RA enters the neutral state, whereby transmission of the motive power from the reverse mechanism RA to the drive wheels DW is disconnected.

In a step 8 following the above-described step 7, it is determined whether or not the second in-gear completion flag F_FIN2 is equal to 1. If the answer to this question is negative (NO) (F_FIN2=0), the second speed position in-gear operation is executed (step 9). With this operation, the speed position of the second gear mechanism GA2 is set to the second speed position.

Next, it is determined whether or not the second speed position in-gear operation has been completed (step 10). This determination is performed based on the detection signal from the above-described speed position sensor 63. If the answer to the question of the step 10 is negative (NO), i.e. if the second speed position in-gear operation has not been completed, the present process is immediately terminated, whereas if the answer to the question of the step 10 is affirmative (YES), i.e. if the second speed position in-gear operation has been completed, to indicate the fact, the second in-gear completion flag F_FIN2 is set to 1 (step 11), and the process proceeds to a step 12 following the step 11. By executing the step 11, the answer to the question of the above-described step 8 becomes affirmative (YES), and in this case, the above-described steps 9 to 11 are skipped for the process to directly proceed to the step 12.

In the step 12 et seq., execution of the first speed position in-gear operation and setting of the first in-gear completion flag F_FIN1 are performed, similarly to the steps 8 to 11. Specifically, in the step 12, it is determined whether or not the first in-gear completion flag F_FIN1 is equal to 1. If the answer to this question is negative (NO) (F_FIN1=0), the first speed position in-gear operation is executed (step 13). With this operation, the speed position of the first gear mechanism GA1 is set to the first speed position.

Next, it is determined whether or not the first speed position in-gear operation has been completed (step 14). This determination is performed based on the detection signal from the above-described speed position sensor 63. If the answer to the question of the step 14 is negative (NO), i.e. if the first speed position in-gear operation has not been completed, the present process is immediately terminated, whereas if the answer to the question of the step 14 is affirmative (YES), i.e. if the first speed position in-gear operation has been completed, to indicate the fact, the first in-gear completion flag F_FIN1 is set to 1 (step 15), followed by terminating the present process. By executing the step 15, the answer to the question of the above-described step 12 becomes affirmative (YES), and in this case, the above-described steps 13 to 15 are skipped for the present process to be immediately terminated.

As described hereinabove, according to the above-described in-gear control process, during stoppage of and at the standing start of the vehicle V (YES to the step 1), when the shift position SP is at the parking position P or the neutral position N (YES to the step 2), the first neutral control is executed (the step 3). With this operation, the first to third disconnection operations of the connection/disconnection mechanism are executed, whereby transmission of the motive power from the first and second gear mechanisms GA1 and GA2, and the reverse mechanism RA to the drive wheels DW is interrupted.

From this state, when the shift position SP is switched to the drive position D or the sport position S (YES to the step 6), the second neutral control, the second speed position in-gear operation, and the first speed position in-gear operation are executed (the steps 7, 9, and 13). With these operations, transmission of the motive power from the reverse mechanism RA to the drive wheels DW continues to be disconnected, and the speed positions of the first and second gear mechanisms GA1 and GA2 are set to the first speed position and the second speed position, respectively. Then, there is connected transmission of the motive power from the first and second gear mechanisms GA1 and GA2 to the drive wheels DW by the speed positions. Further, when the second and first speed position in-gear operations have been completed, to indicate the fact, the second and first in-gear completion flags F_FIN2 and F_FIN1 are set to 1, respectively (the steps 11 and 15).

Note that as shown in FIG. 4, the first speed position in-gear operation is executed after the completion of the second speed position in-gear operation because the second and first speed position in-gear operations are executed by the same gear actuator 53, and the second speed position of the second gear mechanism GA2 is set as the speed position for the standing start of the vehicle V, as mentioned above.

Next, a clutch control process for controlling the operations of the first and second clutches 5 and 6 during stoppage of and at the standing start of the vehicle V will be described with reference to FIG. 5. First, in a step 21 in FIG. 5, it is determined whether or not the above-mentioned stoppage/standing start time flag F_STPORDR is equal to 1. If the answer to this question is negative (NO), the present process is immediately terminated, whereas if the answer to the question is affirmative (YES), i.e. if the vehicle V is at a stop or at a standing start, it is determined whether the detected shift position SP is at the parking position P or the neutral position N (step 22).

If the answer to the question of the step 22 is affirmative (YES), i.e. if the shift position SP is at the parking position P or the neutral position N, clutch disengagement control is executed (step 23), followed by terminating the present process. By executing the step 23, the first and second clutches 5 and 6 are controlled to the respective disengaged states, whereby the first and second clutch oil pressures PO1 and PO2 become equal to the above-mentioned disengagement pressure PREL.

On the other hand, if the answer to the question of the step 22 is negative (NO), i.e. if the shift position SP is not at either the parking position P or the neutral position N, it is determined whether or not the shift position SP is at the drive position D or the sport position S (step 24). If the answer to this question is negative (NO), i.e. if the shift position SP is not at any of the parking position P, the neutral position N, the drive position D, and the sport position S, but is at the reverse position R, the present process is immediately terminated.

On the other hand, if the answer to the question of the above-described step 24 is affirmative (YES), i.e. if the shift position SP is at the drive position D or the sport position S, it is determined whether or not the clutch engagement permission flag F_ALLO is equal to 1 (step 25). If the answer to this question is negative (NO) (F_ALLO=0), it is determined whether or not the second in-gear completion flag F_FIN2 set in the above-described step 4 or 11 in FIG. 4 is equal to 1 (step 26). If the answer to this question is negative (NO) (F_FIN2=0), i.e. if the second speed position in-gear operation has not been completed, the clutch disengagement control is executed by executing the above-described step 23, followed by terminating the present process.

On the other hand, if the answer to the question of the above-described step 26 is affirmative (YES) (F_FIN2=1), i.e. if the second speed position in-gear operation has been completed, it is determined whether or not the first in-gear completion flag F_FIN1 is equal to 1 (step 27). If the answer to this question is negative (NO) (F_FIN1=0), i.e. if the first speed position in-gear operation has not been completed, it is determined whether or not a standing start request flag F_REQDR is equal to 1 (step 28). This standing start request flag F_REQDR is set to 1 when it is determined that a request for the standing start of the vehicle V has been made by the driver. In this case, it is determined that a request for the standing start of the vehicle V has been made by the driver when the following conditions (a) and (b) are both satisfied.

(a) The brake pedal is not stepped on, whereby the brake switch 67 delivers the off signal to the ECU 2.

(b) The accelerator pedal is stepped on, whereby the detected accelerator pedal opening AP is larger than 0.

If the answer to the question of the step 28 is negative (NO) (F_REQDR=0), i.e. if the request for the standing start of the vehicle V has not been made by the driver, the clutch disengagement control is executed by executing the above-described step 23, followed by terminating the present process. On the other hand, if the answer to the question of the step 28 is affirmative (YES) (F_REQDR=1), i.e. if the request for the standing start of the vehicle V has been made by the driver, second standing-start clutch control is executed (step 29), followed by terminating the present process. In this second standing-start clutch control, by progressively increasing the degree of engagement of the second clutch 6, the second clutch 6 is completely engaged, and the first clutch 5 is held in the disengaged state.

On the other hand, if the answer to the question of the step 27 is affirmative (YES) (F_FIN1=1), i.e. if the second and first speed position in-gear operations have been completed, to permit engagement of the first and second clutches 5 and 6, the clutch engagement permission flag F_ALLO is set to 1 (step 30), and the process proceeds to a step 31 following the step 30. By executing the step 30, the answer to the question of the above-described step becomes affirmative (YES). In this case, the above-described steps 26, 27, and 30 are skipped for the present process to directly proceed to the step 31.

In the step 31, it is determined whether or not the above-mentioned standing start request flag F_REQDR is equal to 1. If the answer to this question is negative (NO) (F_REQDR=0), i.e. if the request for the standing start of the vehicle V has not been made by the driver, the clutch disengagement control is executed (step 32), similarly to the above-described step 23, followed by terminating the present process.

On the other hand, if the answer to the question of the above-described step 31 is affirmative (YES) (F_REQDR=1), i.e. if the request for the standing start of the vehicle V has been made by the driver, it is determined whether or not a required torque TREQ is larger than a predetermined value TREF (step 33). This required torque TREQ is torque required for the drive wheels DW, and is calculated by searching a predetermined map according to the accelerator pedal opening AP. If the answer to the question of the step 33 is negative (NO), i.e. if the required torque TREQ is not larger than the predetermined value TREF, the second standing-start clutch control is executed by executing the above-described step 29, followed by terminating the present process.

On the other hand, if the answer to the question of the above-described step 33 is affirmative (YES), i.e. if the required torque TREQ is larger than the predetermined value TREF, first standing-start clutch control is executed (step 34), followed by terminating the present process. In this first standing-start clutch control, by progressively increasing the degree of engagement of the first clutch 5, the first clutch 5 is completely engaged, and the second clutch 6 is held in the disengaged state.

As described hereinabove, according to the above-described clutch control process, during stoppage of and at the standing start of the vehicle V (YES to the step 21), when the shift position SP is at the parking position P or the neutral position N (YES to the step 2), the clutch disengagement control is executed (the step 23), whereby the first and second clutches 5 and 6 are both controlled to the disengaged states.

From this state, when the shift position SP is switched to the drive position D or the sport position S (YES to the step 24), if the second speed position in-gear operation has not been completed (NO to the step 26), the clutch disengagement control is executed (the step 23), whereby the first and second clutches 5 and 6 continue to be held in the disengaged states. In this case, also when the second speed position in-gear operation has been completed but the first speed position in-gear operation has not been completed (YES to the step 26, and NO to the step 27), and also the request for the standing start of the vehicle V has not been made by the driver (NO to the step 28), the clutch disengagement control is executed. On the other hand, when the request for the standing start of the vehicle V has been made by the driver (YES to the step 28), the second standing-start clutch control is executed (the step 29). With this operation, the degree of engagement of only the second clutch 6 is progressively increased, whereby only the second clutch 6 is completely engaged.

Further, when the shift position SP is switched to the drive position D or the sport position S, if both the first and second speed position in-gear operations have been completed (YES to the step 26, and YES to the step 27), the clutch engagement permission flag F_ALLO is set to 1 (the step 30), whereby the engagement of the first and second clutches 5 and 6 is permitted. In this case, if the request for the standing start of the vehicle V has not been made by the driver (NO to the step 31), the clutch disengagement control is executed (the step 32). With this operation, the first and second clutches 5 and 6 are held in the disengaged states. Further, when the shift position SP is switched to the drive position D or the sport position S, if both the first and second speed position in-gear operations have been completed, and also the request for the standing start of the vehicle V has been made by the driver (YES to the step 31), the first or second standing-start clutch control is executed based on a result of comparison between the required torque TREQ and the predetermined value TREF (the steps 33, 34, and 29).

Next, a lubricating oil control process for controlling the above-mentioned clutch lubricating oil supply amount (the amount of lubricating oil supplied to the first and second clutches 5 and 6) will be described with reference to FIG. 6. This process is repeatedly executed whenever a predetermined time period (e.g. 100 msec) elapses. First, in a step 41 shown in FIG. 6, it is determined whether or not the detected first clutch oil pressure PO1 or second clutch oil pressure PO2 is higher than the disengagement pressure PREL. If the answer to this question is affirmative (YES), i.e. if the first or second clutch oil pressure PO1 or PO2 is higher than the disengagement pressure PREL, that is, if the first or second clutch 5 or 6 is engaged, a target lubricating oil supply amount QLOBJ is set to a first predetermined amount QREF1 (step 42), followed by terminating the present process. This target lubricating oil supply amount QLOBJ is a target value of the clutch lubricating oil supply amount, and the above-mentioned flow rate-switching valve 85 is controlled such that the clutch lubricating oil supply amount becomes equal to the target lubricating oil supply amount QLOBJ.

On the other hand, if the answer to the question of the above-described step 41 is negative (NO), i.e. if both the first and second clutch oil pressures PO1 and PO2 are not higher than the disengagement pressure PREL, that is, if both the first and second clutches 5 and 6 are disengaged, the target lubricating oil supply amount QLOBJ is set to a second predetermined amount QREF2 (step 43), followed by terminating the present process. This second predetermined amount QREF2 is set to a value smaller than the above-mentioned first predetermined amount QREF1.

Figure 7:
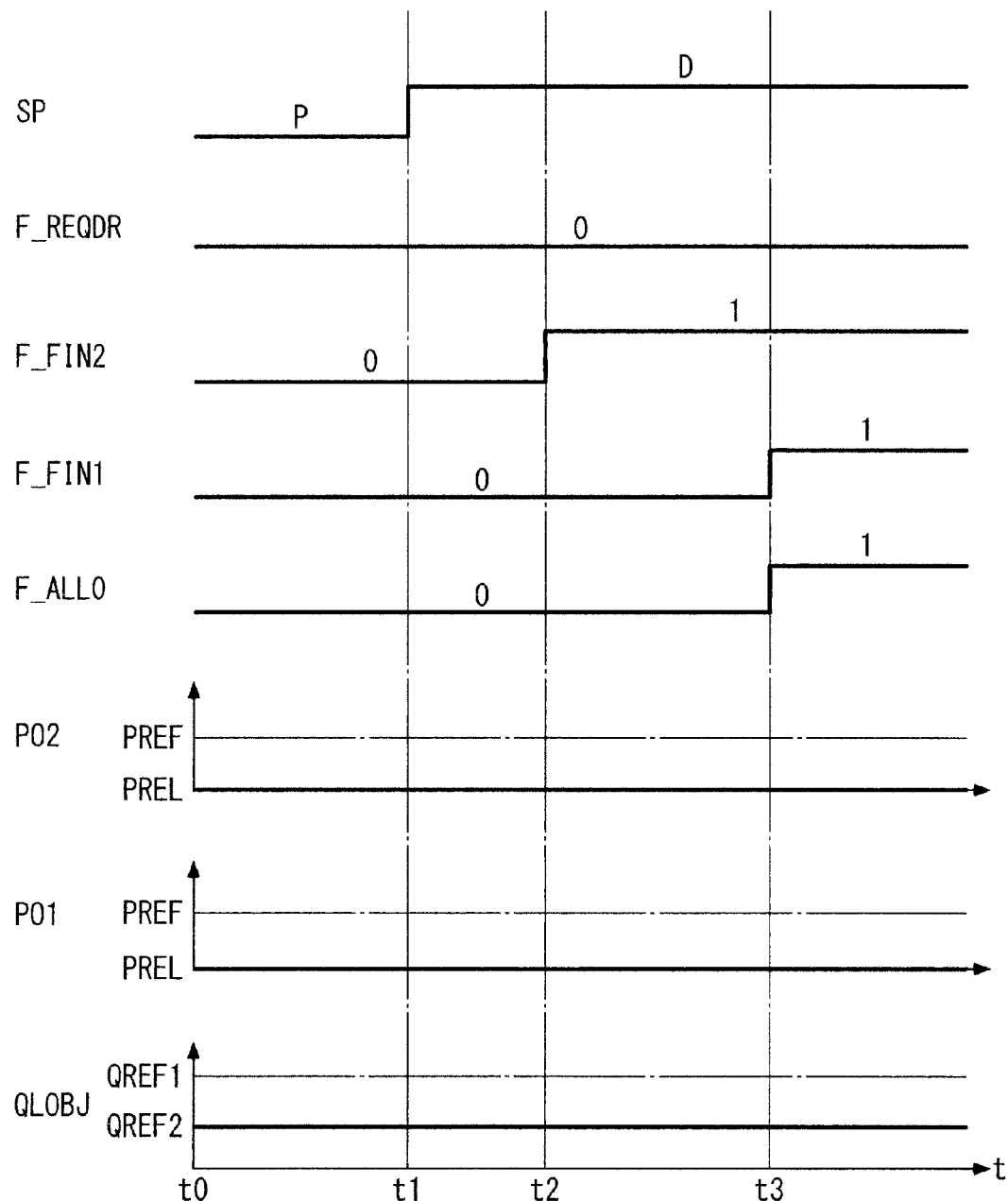
FIG. 7 is a timing diagram showing an example of operation performed by the automatic transmission.

Further, FIG. 7 shows an example of operation performed by the automatic transmission 1 when the request for the standing start of the vehicle V has not been made by the driver (F_REQDR=0). As shown in FIG. 7, when the shift position SP is at the parking position P (time t0 and thereafter), the first and second gear mechanisms GA1 and GA2 are controlled to the neutral states (the step 3 in FIG. 4); the first and second in-gear completion flags F_FIN1 and F_FIN2 and the clutch engagement permission flag F_ALLO are set to 0 (the steps 4 and 5); and the first and second clutches 5 and 6 are controlled to the disengaged states (the step 23 in FIG. 5). Along therewith, the first and second clutch oil pressures PO1 and PO2 are held in the disengagement pressure PREL. Further, since the first and second clutch oil pressures PO1 and PO2 are equal to the disengagement pressure PREL, the target lubricating oil supply amount QLOBJ is held at the second predetermined amount QREF2 (the step 43 in FIG. 6)

Then, when the shift position SP is switched from the parking position P to the drive position D (time t1), the first and second speed position in-gear operations are executed (the steps 9 and 13 in FIG. 4). Along with the completion of this second speed position in-gear operation, the second in-gear completion flag F_FIN2 is set to 1 (time t2; the step 11), and along with the completion of the first speed position in-gear operation, the first in-gear completion flag F_FIN1 is set to 1 (time t3; the step 15). In this case, as described in the in-gear control process (FIG. 4), the first and second speed position in-gear operations are executed by the same gear actuator 53, and after the completion of the second speed position in-gear operation, the first speed position in-gear operation is executed, whereafter this operation is completed, so that as shown in FIG. 7, the first in-gear completion flag F_FIN1 is set to 1 with some delay after the second in-gear completion flag F_FIN2 has been set to 1.

Further, when not only the second speed position in-gear operation but also the first speed position in-gear operation has been completed (time t3; YES to the step 27 in FIG. 5), the clutch engagement permission flag F_ALLO is set to 1 in order to permit the engagement of the first and second clutches 5 and 6 (step 30). In this case, since the request for the standing start of the vehicle V has not been made by the driver (NO to the step 31), the clutch disengagement control is executed (the step 32). With this operation, the first and second clutches 5 and 6 are held in the disengaged states. Further, along with the above-mentioned control of the first and second clutches 5 and 6, the first and second clutch oil pressures PO1 and PO2 continue to be held at the disengagement pressure PREL, and the target lubricating oil supply amount QLOBJ continues to be held at the second predetermined amount QREF2.

Figure 8:
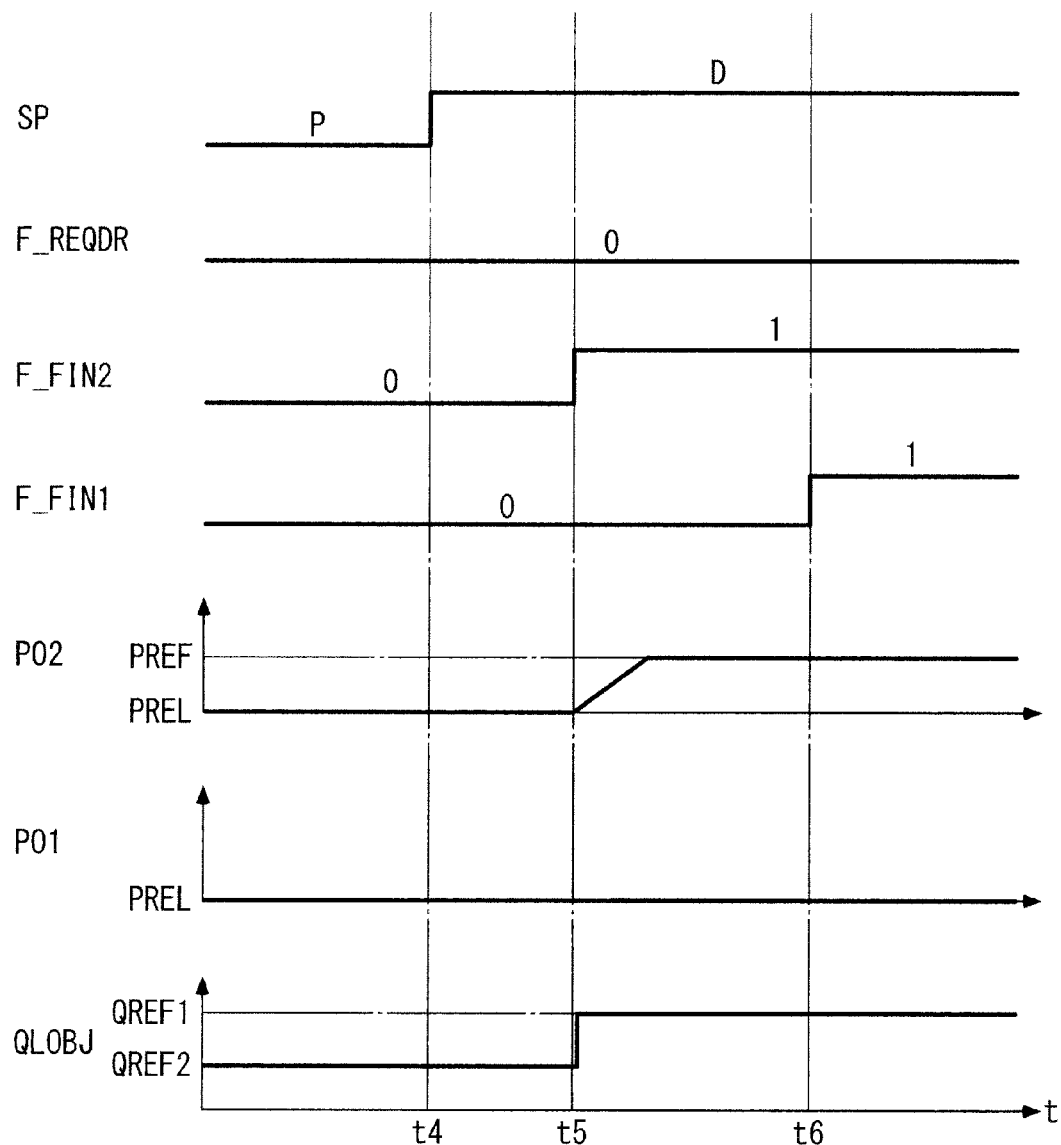
FIG. 8 is a timing diagram showing a comparative example of the operation shown in FIG. 7.

FIG. 8 is a timing diagram showing a comparative example of the operation shown in FIG. 7. As shown in FIG. 8, in this comparative example, after switching the shift position SP to the drive position D (time t4), when the second speed position in-gear operation has been completed (time t5), predetermined clutch control for creeping is executed. With this operation, the second clutch 6 is controlled to a half-clutch state, and the first clutch 5 is disengaged. Along therewith, the second clutch oil pressure PO2 is progressively increased from the disengagement pressure PREL to a predetermined pressure PREF, and the first clutch oil pressure PO1 is held at the disengagement pressure PREL.

Further, to suit the progressive increase in the second clutch oil pressure PO2, the target lubricating oil supply amount QLOBJ is set to the first predetermined amount QREF1 larger than the second predetermined amount QREF2. This controls the clutch lubricating oil supply amount (the amount of lubricating oil supplied to the first and second clutches 5 and 6) such that the clutch lubricating oil supply amount becomes equal to the first predetermined amount QREF1, whereby the clutch friction of the first clutch 5 is increased, which in turn increases motive power transmitted from the engine 3 to the first gear mechanism GA1 via the first clutch 5. As a consequence, the first input shaft 11 of the first gear mechanism GA1 connected to the engine 3 is rotated, whereby a large differential rotation is generated between the first input shaft 11 and the carrier 7 connected to the drive wheels DW at rest, and accordingly a large differential rotation is generated between the ring gear 7*b* and the casing 8.

After that, the first speed position in-gear operation is completed, and the first in-gear completion flag F_FIN1 is set to 1 (time t6). As described above, in the comparative example shown in FIG. 8, the second clutch 6 is controlled to the half-clutch state before completion of the first speed position in-gear operation. This causes the ring gear 7b and the casing 8 to be connected in a state in which the large differential rotation is generated between the ring gear 7b and the casing 8, as mentioned above, and then the first speed position in-gear operation is completed, which causes large vibration.

On the other hand, as described hereinabove with reference to FIGS. 5 and 7, according to the automatic transmission 1 of the present embodiment, the engagement of the first and second clutches 5 and 6 is permitted only upon completion of both the second and first speed position in-gear operations but is inhibited before completion of the same, which prevents generation of large vibration, differently from the above-described comparative example.

Figure 9:
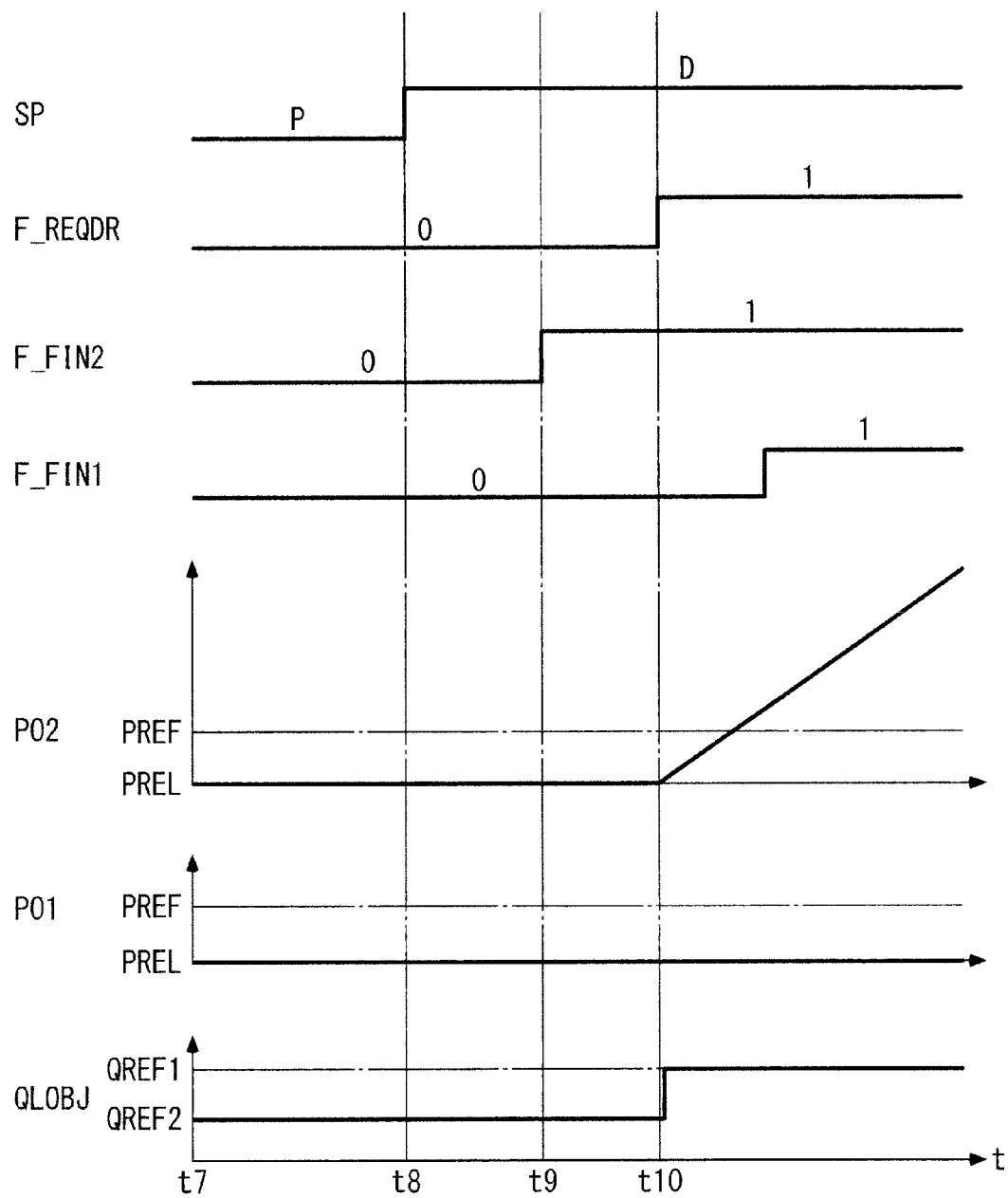
FIG. 9 is a timing diagram showing an example of operation performed by the automatic transmission, different from the example shown in FIG. 7.

Further, FIG. 9 shows an example of operation performed by the automatic transmission 1 when the request for the standing start of the vehicle V has been made by the driver (F_REQDR=1). More specifically, FIG. 9 shows an example of operation of the automatic transmission 1 performed when the request for the standing start of the vehicle V is made after the shift position SP has been switched from the parking position P to the drive position D and the second speed position in-gear operation has been completed, before the first speed position in-gear operation is completed. In the example illustrated in FIG. 9, operations performed before the request for the standing start of the vehicle V is made (operations performed from time t7 to time immediately before time t10) are the same as the operations in the above-described example shown in FIG. 7, and hence operations performed after the request has been made will be described, hereinafter.

In the case where the shift position SP has been switched from the parking position P to the drive position D, and the second speed position in-gear operation has been completed, but the first speed position in-gear operation has not been completed (NO to the step 27 in FIG. 5), when the request for the standing start of the vehicle V is made (time t10, YES to the step 28), the second standing-start clutch control is executed (the step 29). With this operation, the degree of engagement of the second clutch 6 is progressively increased, whereby the second clutch 6 is completely engaged, and the first clutch 5 is controlled to the disengaged state. From the above, the motive power of the engine 3 is transmitted to the second gear mechanism GA2 via the second clutch 6, and is transmitted to the drive wheels DW in a state changed in speed at the transmission gear ratio of the second speed position. Further, along with the above-described control of the first and second clutches 5 and 6, the second clutch oil pressure PO2 is progressively increased beyond the predetermined pressure PREF, and the first clutch oil pressure PO1 continues to be held at the disengagement pressure PREL. Further, to suit the increase of the second clutch oil pressure PO2 beyond the disengagement pressure PREL, the target lubricating oil supply amount QLOBJ is set to the first predetermined amount QREF1, similarly to the example shown in FIG. 7.

In this case, the second clutch 6 is engaged after completion of the second speed position in-gear operation, and before completion of the first speed position in-gear operation, so that although vibration is caused by the engagement of the second clutch 6, the vehicle V is started, which makes it possible to prevent the driver from feeling uncomfortable to thereby prevent marketability from being degraded.

Figure 10:
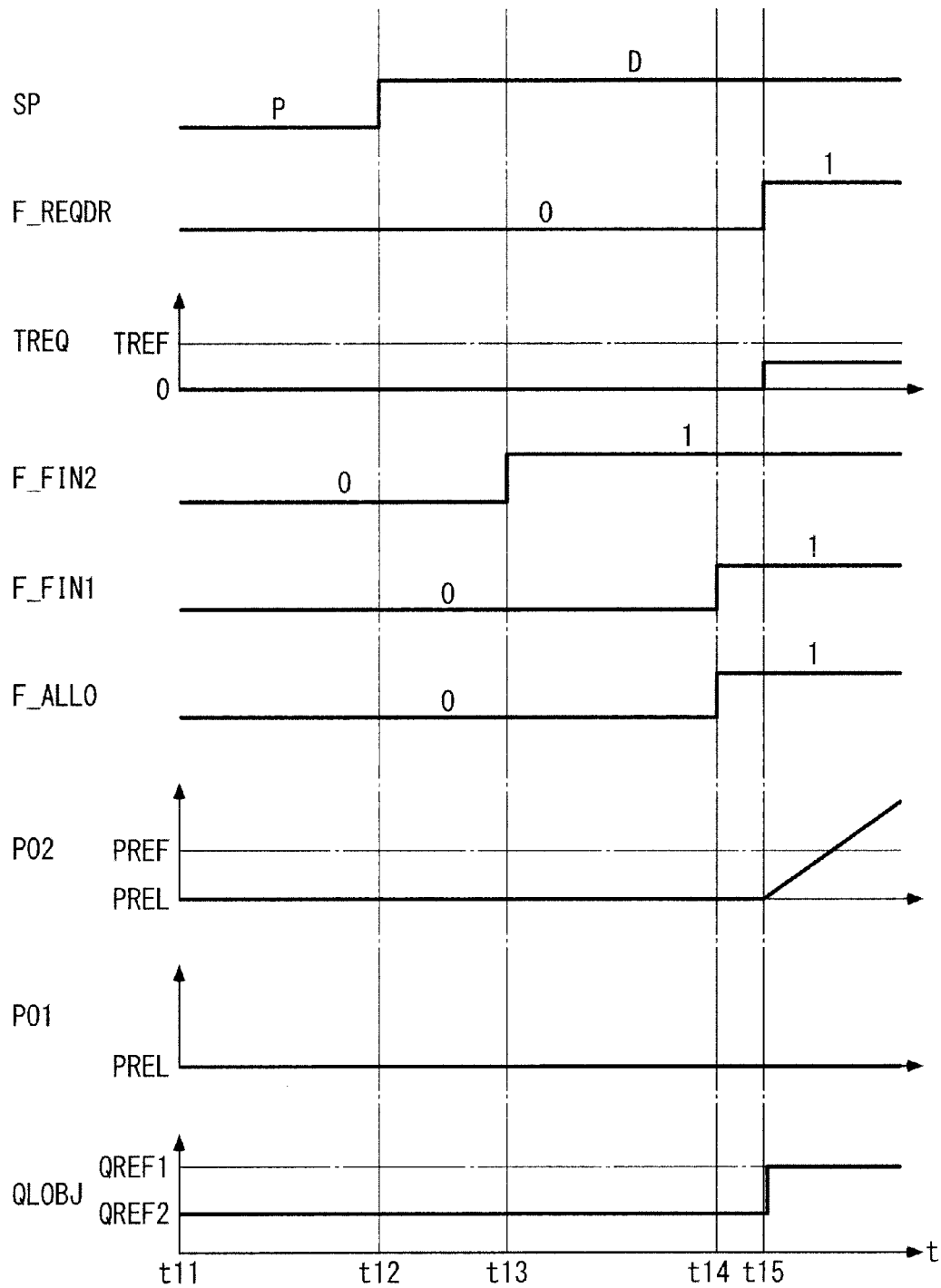
FIG. 10 is a timing diagram showing an example of operation performed by the automatic transmission, different from the examples shown in FIGS. 7 and 9.

Further, FIG. 10 shows an example of operation performed by the automatic transmission 1 when the request for the standing start of the vehicle V is made after both the first and second speed position in-gear operations have been completed, in a case where the shift position SP has been switched to the drive position D. In the example illustrated in FIG. 10, operations performed before the request for the standing start of the vehicle V is made (operations performed from time t11 to time immediately before time t14) are the same as the operations in the above-described example shown in FIG. 7, and hence operations performed after the request for the standing start of the vehicle V has been made will be described, hereinafter.

Referring to FIG. 10, when the request for the standing start of the vehicle V is made (time t15), a required torque TREQ at the time is not larger than the predetermined value TREF (NO to the step 33 in FIG. 5), and hence the second standing-start clutch control is executed (the step 29). With this operation, the degree of engagement of the second clutch 6 is progressively increased, whereby the second clutch 6 is completely engaged, and the first clutch 5 is controlled to the disengaged state. From the above, similarly to the example illustrated in FIG. 9, the motive power of the engine 3 is transmitted to the drive wheels DW via the second clutch 6 and the second gear mechanism GA2 in a state changed in speed at the transmission gear ratio of the second speed position. Further, along with the above-described control of the first and second clutches 5 and 6, the second clutch oil pressure PO2 is progressively increased beyond the predetermined pressure PREF, and the first clutch oil pressure PO1 continues to be held at the disengagement pressure PREL.

Further, the correspondence between various elements of the present embodiment and various elements of the invention is as follows: The engine 3 in the present embodiment corresponds to a prime mover in the present invention, and the third speed synchronization mechanism 16, the fifth-seventh speed synchronization mechanism 17, the first speed synchronization mechanism 18, the second speed synchronization mechanism 25, the fourth-sixth speed synchronization mechanism 26, the gear actuator 53, and the ECU 2 in the present embodiment correspond to a connection/interruption device in the present invention. Further, the shift position sensor 65 in the present embodiment corresponds to shift position-detecting means in the present invention, and the accelerator pedal opening sensor 66, the brake switch 67, and ECU 2 in the present embodiment correspond to determination means in the present invention. Furthermore, the ECU 2 corresponds to control means and required torque-calculating means in the present invention, and the lubricating oil supply system 80 and the ECU 2 in the present embodiment correspond to a lubricating oil supply system in the present invention.

As described above, according to the present embodiment, the connection/disconnection mechanism provided in the first and second gear mechanisms GA1 and GA2 executes the first, third, fifth, and seventh speed position in-gear operations, whereby the respective transmissions of the motive power from the first gear mechanism GA1 to the drive wheels DW, using the first, third, fifth, and seventh speed positions, are connected, and the transmissions of the motive power are disconnected by executing the first disconnection operation. Further, the connection/disconnection mechanism executes the second, fourth, and sixth speed position in-gear operations, whereby the respective transmissions of the motive power from the second gear mechanism GA2 to the drive wheels DW, using the second, fourth, and sixth speed positions, are connected, and the transmissions of the motive power are disconnected by executing the second disconnection operation.

Further, as described with reference to FIG. 5, when the shift position SP is at the parking position P or the neutral position N, the first and second clutches 5 and 6 are disengaged, whereby the engine 3 is disconnected from the first and second gear mechanisms GA1 and GA2. Furthermore, as described with reference to FIG. 4, when the shift position SP has been switched from the parking position P or the neutral position N to the drive position D or the sport position S, the first and second speed position in-gear operations are executed, whereby transmission of the motive power from the first and second gear mechanisms GA1 and GA2 to the drive wheels DW is connected. Further, in the case where the shift position SP has been switched to the drive position D or the sport position S, when it is determined that the request for the standing start of the vehicle V has not been made by the driver, i.e. during stoppage of the vehicle V, the engagement of the first and second clutches 5 and 6 which have been in the disengaged state theretofore is permitted after completion of the above-described first and second speed position in-gear operations, i.e. after connection of transmission of the motive power from the first and second gear mechanisms GA1 and GA2 to the drive wheels DW has been completed. In other words, the engagement of the first and second clutches 5 and 6 is inhibited up to completion of the first and second speed position in-gear operations.

With this operation, during stoppage of the vehicle V, neither of the first and second speed position in-gear operations is executed during or after completion of an engagement operation of one of the first and second clutches 5 and 6. Therefore, it is possible to avoid execution of the first and second speed position in-gear operations in a state where a large differential rotation is generated between portions of the first and second gear mechanisms GA1 and GA2, connected to the engine 3, and portions of the two gear mechanisms GA1 and GA2, connected to the drive wheels DW, which in turn prevents vibration from being caused by executing the first and second speed position in-gear operations, thereby making it possible to improve marketability.

In this case, the first and second speed position in-gear operations are executed beforehand when the shift position SP has been switched to the drive position D or the sport position S. Further, the second speed position for the standing start of the vehicle V is selected as a speed position used in the second speed position in-gear operation. From the above, at the subsequent standing start of the vehicle V, torque of the engine 3 can be transmitted to the drive wheels DW quickly via one of the first and second clutches 5 and 6 and an associated one of the first and second gear mechanisms GA1 and GA2, and therefore it is possible to obtain excellent startability of the vehicle V. As described above, it is possible to cause the first and second clutches 5 and 6 and the connection/disconnection mechanism to properly operate during stoppage of the vehicle V, thereby making it possible not only to prevent vibration and improve marketability but also to obtain excellent startability of the vehicle V.

Further, when the shift position SP has been switched to the drive position D or the sport position S, the first speed position with a transmission gear ratio larger (on a lower-speed side) than that of the second speed position is selected as the speed position of the first gear mechanism GA1. With this operation, the increasing degree of torque by the first gear mechanism GA1 becomes larger than that of torque by the second gear mechanism GA2. Further, when the shift position SP has been switched to the drive position D or the sport position S, and also it is determined that a request for the standing start of the vehicle V has been made by the driver, when the first and second speed position in-gear operations have been completed, one of the first and second clutches 5 and 6 is selected based on the required torque TREQ, and the selected one of the clutches is engaged, whereas the other clutch is disengaged. With this operation, at the standing start of the vehicle V, the torque of the engine 3 can be transmitted to the drive wheels DW using one of the first and second gear mechanisms GA1 and GA2, associated with the selected one of the clutches, in a state in which the engine torque is increased to meet the required torque TREQ.

Furthermore, the clutch lubricating oil supply amount, which is the amount of lubricating oil supplied to the first and second clutches 5 and 6, is changed by the lubricating oil supply system 80. In this case, the target lubricating oil supply amount QLOBJ, which is the target value of the clutch lubricating oil supply amount, is set to the first predetermined amount QREF1 when one of the first and second clutches 5 and 6 is engaged, whereas when the first and second clutches 5 and 6 are disengaged, the target lubricating oil supply amount QLOBJ is set to the second predetermined amount QREF2, and this second predetermined amount QREF2 is set to a value smaller than the first predetermined amount QREF1. As a consequence, when the first and second clutches 5 and 6 are both disengaged, the clutch friction can be suppressed, so that it is possible to prevent vibration from being caused by executing the first and second speed position in-gear operations.

Note that the present invention is by no means limited to the embodiment described above, but can be practiced in various forms. For example, although in the above-described embodiment, the first speed position of the first gear mechanism GA1 is implemented by the planetary gear unit 7, it may be implemented by a first speed drive gear fixed to one of the first input shaft 11 and the output shaft 30, and a first speed driven gear rotatably provided on the other of the first input shaft 11 and the output shaft 30. Further, although in the above-described embodiment, the output shaft 30, the second-third speed driven gear 31, the fourth-fifth speed driven gear 32, and the sixth-seventh speed driven gear 33 are shared by the first and second gear mechanisms GA1 and GA2, they may be separately provided for the respective first and second gear mechanisms GA1 and GA2. Further, in this case, a second speed driven gear may be rotatably disposed without being fixed to an output shaft of the second gear mechanism, and may be connected by the second speed synchronization mechanism, and the second speed drive gear may be fixed to the second input shaft. The same applies to a third speed driven gear, the third speed drive gear, a fourth speed driven gear, the fourth speed drive gear, a fifth speed driven gear, the fifth speed drive gear, a sixth speed driven gear, the sixth speed drive gear, a seventh speed driven gear, and the seventh speed drive gear.

Furthermore, although in the above-described embodiment, the first, third, fifth, and seventh speed positions are set as the speed positions of the first gear mechanism GA1, and the second, fourth, and sixth speed positions are set as the speed positions of the second gear mechanism GA2, a plurality of other suitable speed positions may set. Further, although in the above-described embodiment, gear mechanisms of a type which connects gears to a shaft using a synchronization mechanism are used as the first and second gear mechanisms GA1 and GA2, any other suitable gear mechanisms, such as gear mechanisms each formed by a combination of a plurality of planetary gear units and brakes, may be employed insofar as they are capable of transmitting input motive power to the drive wheels DW in a state in which the speed of the motive power is changed at a transmission gear ratio of one of a plurality of speed positions.

Further, although in the above-described embodiment, the first and second clutches 5 and 6 are wet multiple-disc clutches, they may be replaced by dry multiple-disc clutches or electromagnetic clutches. Further, although in the above-described embodiment, after the first and second speed position in-gear operations have been completed, if the request for the standing start of the vehicle V has not been made by the driver, the second clutch 6 is engaged (in a half-clutch state) and the first clutch 5 is held in the disengaged state, this is not limitative, but inversely to the above, the first clutch 5 may be engaged with the second clutch 6 being held in the disengaged state. Furthermore, although in the above-described embodiment, the engine 3, which is a gasoline engine, is used as the prime mover in the present invention, a diesel engine, an LPG engine, or an electric motor may be used. Further, it is possible to modify details of the construction of the embodiments as required within the spirit and scope of the present invention.

It is further understood by those skilled in the art that the foregoing are preferred embodiments of the invention, and that various changes and modifications may be made without departing from the spirit and scope thereof.

What is claimed is:

1. An automatic transmission for transmitting motive power of a prime mover to drive wheels of a vehicle in a state in which a speed of the motive power is stepwise changed, comprising:
   a first gear mechanism that is connected to the prime mover and the drive wheels, for transmitting the motive power of the prime mover to the drive wheels in a state in which the speed of the motive power is changed at a transmission gear ratio of one speed position of a first speed position group composed of a plurality of speed positions;
   a first clutch that is engaged/disengaged to thereby connect/disconnect between the prime mover and said first gear mechanism;
   a second gear mechanism that is disposed in parallel with said first gear mechanism, and is connected to the prime mover and the drive wheels, for transmitting the motive power of the prime mover to the drive wheels in a state in which the speed of the motive power is changed at a transmission gear ratio of one speed position of a second speed position group composed of a plurality of speed positions;
   a second clutch that is engaged/disengaged to thereby connect/disconnect between the prime mover and said second gear mechanism;
   control means for controlling said first and second clutches;
   a single connection/disconnection device that is provided for both of said first and second gear mechanisms, and is capable of executing a first connection operation for selecting one speed position from the first speed position group and connecting transmission of motive power from said first gear mechanism to the drive wheels, using the selected one speed position, a first disconnection operation for disconnecting the transmission of the motive power, a second connection operation for selecting one speed position from the second speed position group and connecting transmission of motive power from said second gear mechanism to the drive wheels, using the selected one speed position, and a second disconnection operation for disconnecting the transmission of the motive power;
   shift position-detecting means for detecting a shift position of a shift lever selectively operated by a driver of the vehicle to one of a plurality of shift positions including a non-traveling position for stoppage of the vehicle, and a forward travel position for forward travel of the vehicle; and
   determination means for determining whether or not a request for a standing start of the vehicle has been made by the driver,
   wherein when the detected shift position is at the non-traveling position, said control means disengages said first and second clutches,
   wherein thereafter, when the shift position is switched from the non-traveling position to the forward travel position, said connection/disconnection device executes the first and second connection operations, and in the second connection operation, selects a predetermined standing start speed position for the standing start of the vehicle from the second speed position group,
   wherein in a case where the shift position is switched to the forward travel position, when both the first and second connection operations have been completed, said control means permits engagement of said first and second clutches, and
   wherein in a case where the engagement of said first and second clutches is permitted, when the request for the standing start of the vehicle has been made by the driver, said control means selectively engages one of said first and second clutches.

2. The automatic transmission according to claim 1, wherein said connection/disconnection device selects a speed position with a transmission gear ratio larger than a transmission gear ratio of the predetermined standing start speed position, from the first speed position group, as a speed position for use in the first connection operation executed when the shift position has been switched to the forward travel position,
   the automatic transmission further comprising required torque-calculating means for calculating a required torque required for the drive wheels,
   wherein in a case where the engagement of said first and second clutches is permitted, when the request for the standing start of the vehicle has been made by the driver, said control means selects and engages one of said first and second clutches and disengages the other of said first and second clutches, based on the calculated required torque.

3. The automatic transmission according to claim 1, wherein said first and second clutches are formed by wet clutches that use lubricating oil,
   the automatic transmission further comprising a lubricating oil supply system that supplies the lubricating oil to said first and second clutches, and is capable of changing a lubricating oil supply amount, which is an amount of the lubricating oil supplied to said first and second clutches,
   wherein when one of said first and second clutches is engaged, said lubricating oil supply system sets the lubricating oil supply amount to a first predetermined amount, whereas when both of said first and second clutches are disengaged, said lubricating oil supply system sets the lubricating oil supply amount to a second predetermined amount smaller than the first predetermined amount.

4. The automatic transmission according to claim 2, wherein said first and second clutches are formed by wet clutches that use lubricating oil, the automatic transmission further comprising a lubricating oil supply system that supplies the lubricating oil to said first and second clutches, and is capable of changing a lubricating oil supply amount, which is an amount of the lubricating oil supplied to said first and second clutches, wherein when one of said first and second clutches is engaged, said lubricating oil supply system sets the lubricating oil supply amount to a first predetermined amount, whereas when both of said first and second clutches are disengaged, said lubricating oil supply system sets the lubricating oil supply amount to a second predetermined amount smaller than the first predetermined amount.

* * * * *